(12) United States Patent
Ogawa et al.

(10) Patent No.: US 6,237,108 B1
(45) Date of Patent: *May 22, 2001

(54) MULTIPROCESSOR SYSTEM HAVING REDUNDANT SHARED MEMORY CONFIGURATION

(75) Inventors: Toshio Ogawa; Akira Kabemoto, both of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/942,724

(22) Filed: Oct. 2, 1997

Related U.S. Application Data

(63) Continuation of application No. 08/134,948, filed on Oct. 12, 1993, now abandoned.

(30) Foreign Application Priority Data

Oct. 9, 1992 (JP) .................................................... 4-271671

(51) Int. Cl.⁷ .............................. G06F 11/08; G06F 11/16
(52) U.S. Cl. ............................. 714/6; 714/8; 714/7; 714/9
(58) Field of Search ................................ 395/182.04, 475, 395/489, 182.07, 182.08, 182.11, 182.06, 182.09, 182.1, 182.05

(56) References Cited

U.S. PATENT DOCUMENTS

| | | | |
|---|---|---|---|
| 4,590,554 | * | 5/1986 | Glazer et al. ........................... 714/13 |
| 4,751,702 | * | 6/1988 | Beier et al. ............................. 714/13 |
| 4,799,186 | * | 1/1989 | Ployette ................................ 711/152 |
| 5,086,429 | * | 2/1992 | Gray et al. ............................. 714/13 |
| 5,155,678 | * | 10/1992 | Fukymoto et al. .................. 707/202 |
| 5,185,693 | * | 2/1993 | Loftis et al. ........................ 364/187 |
| 5,193,175 | * | 3/1993 | Cutts, Jr. et al. ...................... 714/11 |
| 5,214,776 | * | 5/1993 | Bagnoli et al. ....................... 711/141 |
| 5,235,700 | * | 8/1993 | Alaiwan et al. ....................... 714/13 |

FOREIGN PATENT DOCUMENTS

| | | |
|---|---|---|
| 3-269745 | 12/1991 | (JP) . |
| 4-105159 | 4/1992 | (JP) . |
| 4-111144 | 4/1992 | (JP) . |

* cited by examiner

*Primary Examiner*—B. James Peikari
(74) *Attorney, Agent, or Firm*—Staas & Halsey LLP

(57) ABSTRACT

A multiprocessor system having a redundant shared memory configuration includes a plurality of processors, each of which are connected to a shared system bus; and a plurality of shared system memory modules, e.g., dual shared system memory modules connected to the shared system bus. A first processor module is operative to write data in one of dual shared system memory modules and subsequently write the data in the other memory module, so as to ensure that the data in both dual shared system memory modules are equivalent to each other. A second processor module monitors a status of the first processor module, and discriminates whether a write operation for the other memory module is finished in normal termination or in abnormal termination in the case where the first processor module stopped operating. The second processor module copies data starting from the address of a first data in the unsuccessfully copied data from the first memory module to the second memory module.

12 Claims, 14 Drawing Sheets

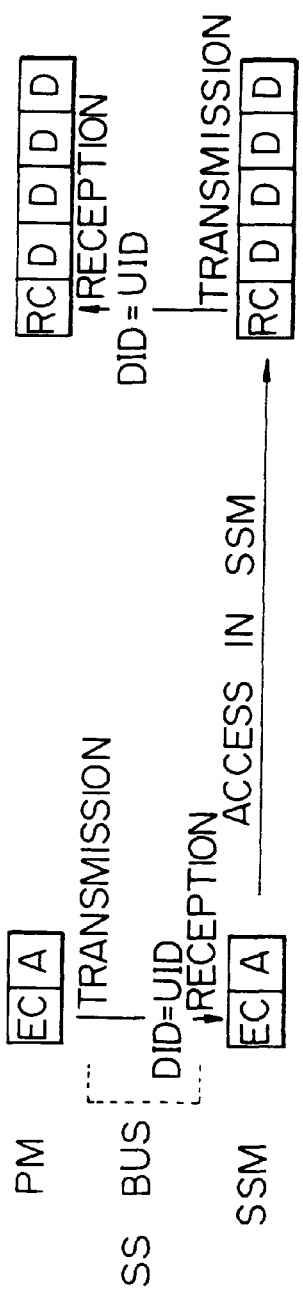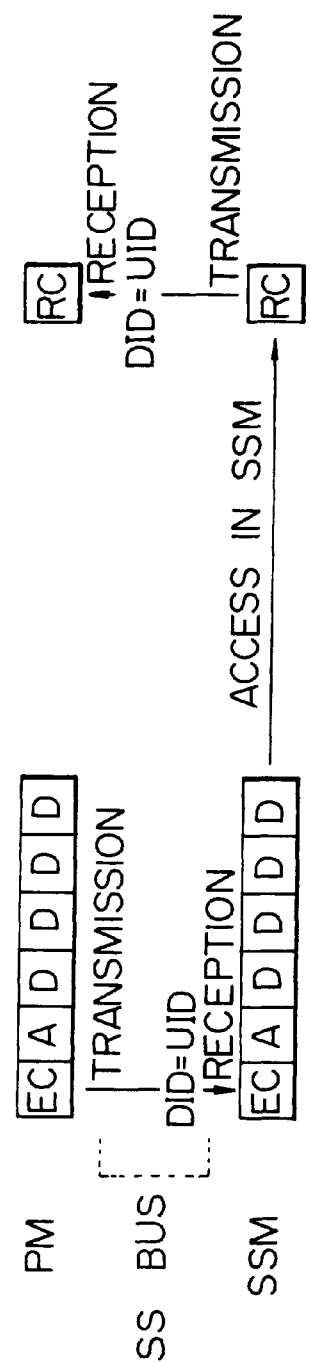
Fig.11A
Fig.11B

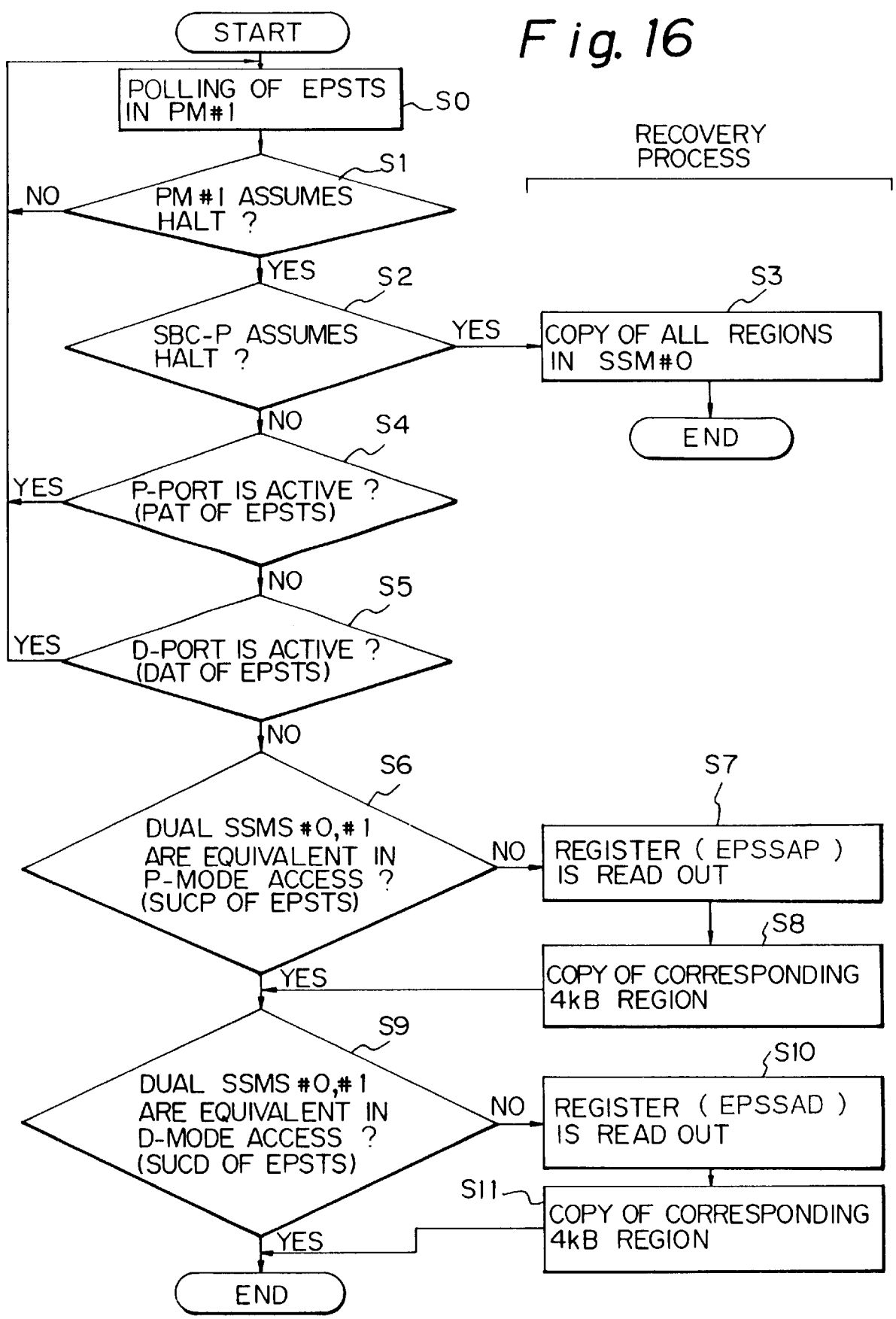

MULTIPROCESSOR SYSTEM HAVING REDUNDANT SHARED MEMORY CONFIGURATION

This application is a continuation, application Ser. No. 08/134,948, filed Oct. 12, 1993, now abandoned.

BACKGROUND OF THE INVENTION

1. Field of the Invention

The present invention relates to a multiprocessor system having a redundant shared memory configuration, which includes a plurality of processors and also a plurality of shared system memories that can be used in common by the plurality of processors and which allows the shared system memories to have redundancy in writing data in these memories.

More specifically, the present invention relates to a multiprocessor system, which ensures that the contents of each pair of shared system memories are equivalent to each other, for example, in the case where same data is written in each pair of shared system memories having a dual shared memory configuration.

2. Description of the Related Art

In recent years, it has been necessary for a relatively large amount of data to be processed at high speed and with high reliability, especially in a field of data communication system using a computer system. To satisfy this requirement, a multiprocessor system has been developed, which is constituted by a plurality of processors each including a central processing unit (usually abbreviated to CPU). Such a multiprocessor system have an ability for processing the data much higher than that in a single processor, by effectively utilizing a plurality of central processing units.

Further, in the above-mentioned multiprocessor system having a plurality of processors, even if a certain processor has failed during operation, any other processor can continue to process the data in place of the failing one. Namely, the above-mentioned multiprocessor system has a redundant configuration in regard to the processors, which can provide a fault tolerant computer system.

Further, to make such a fault tolerant computer system more complete and to ensure a data integrity of the whole multiprocessor system, it appears indispensable that shared system memories provided for supporting a data process at high speed also have a redundant shared memory configuration, e.g., a dual memory configuration.

More specifically, in regard to these dual shared system memories, it is necessarily required that data stored in one of each pair of the dual shared system memories is equivalent to data stored in the other one so as to ensure a conformity of the respective data, especially, when same data is to be written in each pair of dual shared system memories.

However, in general, the situations that a conformity of the respective data fails to be ensured may be brought about mainly in the following three cases. Here, to simplify an explanation about such situations, it is assumed that a multiprocessor system having a number of processor modules includes only one pair of dual shared system memory modules.

(1) The first is the case in which a write operation in one module of the dual shared system memory modules is finished in normal termination, while a write operation in the other module of the dual shared system memory modules is finished in abnormal termination, when a write access to these dual memory modules is carried out by a given processor module. Namely, data is not completely written yet in the other module of the dual shared system memory modules.

However, in this case, the above-mentioned processor module by which a write access was carried out still continues to operate. By means of an abnormal termination message, the processor module can recognize a specified address to which a write access has failed, and therefore assuredly rewrite the data corresponding to the specified address by executing a data recovery process. Consequently, it can be finally ensured that the data written in one of the dual shared system memory modules is equivalent to the data reconstructed by a data recovery process in the other one, and a problem concerning the above-mentioned first case does not become not so serious practically.

(2) The second is the case in which at least one of the dual shared system memory modules determines that it is impossible to continue to perform a normal operation due to a contradiction which has occurred by the shared system memory module per se. In this case, since the shared system memory module cannot assuredly preserve the data that was once stored therein any more, the memory module stops operating after that time and assumes a state of "HALT" (hereinafter, a state of "HALT" will be simply referred to as HALT).

Here, the contradiction in the shared system memory module per se means a logical contradiction which generally occurs when hardware of the shared system memory module is brought out of control. More concretely, as that type of contradiction, an abnormality of a sequencer in a system bus controller which is a connecting unit to a system bus and which will be described hereinafter, an abnormality of another sequencer in a memory controller in the shared system memory module, or the like can be mentioned.

In this case, data that was stored in the shared system memory module assuming HALT is not reliable at all. Accordingly, to assuredly carry out a data recovery process for this type of shared system memory module assuming HALT, it is inevitable to copy or duplicate all the content of the other shared system memory module in a normal state to the shared system memory module assuming HALT. Such a copy process or duplication process is usually executed after the shared system memory module assuming HALT is brought in a state in which a normal operation thereof can be performed.

For example, in the case where the shared system memory module assumes HALT due to a recoverable trouble, etc., that has temporarily occurred by an error of a software type, the normal state thereof can be realized by resetting this memory module assuming HALT and by canceling a state of HALT. On the contrary, in the case where the shared system memory module assumes HALT due to a serious trouble, etc., that has eternally occurred by an error of a hardware type and is usually difficult to remedy, the normal state thereof can be realized only by replacing this memory module assuming HALT with a new memory module.

Generally, in carrying out the above-mentioned copy process of all the content of the normal shared system memory module, the larger the storage capacity of shared system memory module becomes, the longer it takes to complete the copy process. Therefore, a system bus of a multiprocessor system is likely to be occupied by a copy access of a certain processor module for executing such a copy process. Further, in the case where a write access is carried out by some other processor module with respect to the shared system memory module in which such a copy process is being executed by a certain processor module, the copy access command from a certain processor module is likely to contend with the write access command from some other processor module. As a result of such a contention, when the copy process is completed, a disadvantage may occur in that all the data stored in a shared system memory module by the copy process is not always equivalent to that of the other normal shared system memory module.

However, in almost every case among the above-mentioned second case, one of the dual shared system memory modules stops operating to assume HALT due to a trouble that has occurred by some error of a hardware type. In such a case, practically, the replacement of one of the dual shared system memory modules in a state of HALT with a new system memory module becomes necessary, so as to copy all the data of the other one of the dual shared memory modules to the new system memory module after the replacement. Namely, to deal with the shared system memory module in a state of HALT, it is inevitable to carry out troublesome work, such as the replacement of such an abnormal memory module.

Fortunately, it should be noted that a probability, in which a shared system memory module per se assumes HALT due to some error of a hardware type, is extremely low, and that a trouble concerning the above-mentioned second case does not become so serious practically.

(3) The third is the case in which a certain processor module among a plurality of processor modules assumes HALT during a write operation of the dual shared system memory modules; namely, the case in which a write operation is completed in one of the dual shared system memory modules, while a write operation is not completed yet in the other one thereof, at the time when this certain processor module among a plurality of processor modules assumes HALT.

Heretofore, even when a certain processor module assumes HALT in the third case in a multiprocessor system having dual shared memory modules, it is not confirmed whether or not a certain processor module in a state of HALT was carrying out a write access to the dual shared memory modules. Therefore, it cannot be known whether or not the respective data written in the dual shared memory modules is equivalent to each other. Consequently, even in the case where a processor module, which does not carry out a write access to the dual shared memory modules, assumes HALT, the multiprocessor system has been forced to conclude that a conformity of the respective data in the dual shared system memory modules is uncertain and cannot be ensured.

If a conformity of the respective data cannot be ensured as mentioned above, it is obliged to be supposed that the respective data in the dual shared system memory modules is not equivalent to each other. In this case, to carry out a data recovery process, in the similar manner to the above-mentioned second case in which one of the dual shared system memory modules assumes HALT, all the data of one of the dual shared memory modules (normal system memory module) is copied to the other one of the system memory modules.

In carrying out a copy process of all the data of one of the dual shared memory modules, the problems as described in the second case exist. More specifically, a first problem is in that it takes a relatively long time to complete the copy process; a second problem is in that a system bus of the multiprocessor system is occupied by the copy access by a certain processor module; and a third problem is in that a contention of the copy access command with a write access command occurs between two processor modules, in the case where a write access is carried out by some other processor module. Further, a state of HALT in the processor module is brought about not only due to some error of a hardware type, but also due to some error of a software type. Actually, in almost every case, the processor module assumes HALT by the error of a software type, unlike the case of a state of HALT in the shared system memory module per se.

Therefore, a probability, in which the processor module assumes HALT, is much higher than the case of HALT in the shared system memory module. Therefore, the problems concerning the above-mentioned third case becomes very serious.

SUMMARY OF THE INVENTION

In view of the above-described problems existing especially in the third case, the main object of the present invention is to provide a multiprocessor system having a redundant shared memory configuration, which confirms whether or not a certain processor module in a state of HALT was carrying out a write access to dual shared system memory modules and whether or not the respective data in the dual shared system memory modules is equivalent to each other, in the case where a certain processor module assumes HALT.

A further object of the present invention is to provide a multiprocessor system having a redundant shared memory configuration, which stops carrying out a copy process of all the data in one of dual shared system memory modules to the other one thereof, when it becomes clear that the respective data in the dual shared system memory modules is equivalent to each other.

A still further object of the present invention is to provide a multiprocessor system having a redundant shared memory configuration, which copies only the data corresponding to a specified address where an inconformity occurs by executing a data recovery process, even when it becomes clear that the respective data in the dual shared system memory modules is not equivalent to each other.

To attain these objects, the multiprocessor system having a redundant shared memory configuration according to the present invention includes a plurality of processor modules each of which has a central processing unit and a first system bus controller for connecting each processor module to a shared system bus; and a plurality of shared system memory modules each of which has a shared system memory unit that can be used in common by the processor modules and also has a second system bus controller for connecting each shared system memory module to the shared system bus.

In this case, a certain processor module is operative to write data in a given shared system memory module and subsequently write the data in a specified other shared system memory module, so as to ensure that the data respectively written in the two shared system memory modules is equivalent to each other.

Further, in this case, any other processor module monitors a status of the certain processor module, and discriminates whether or not a write operation for the specified other shared system memory module is finished, in the case where the certain processor module stopped operating.

Preferably, a plurality of processor modules are constituted by two processor modules, and a plurality of shared system memory modules are constituted by dual shared system memory modules. Further, a first processor module is operative to write data in a first shared system memory module and subsequently write the data in a second shared system memory module. Further, a second processor module monitors a status of the first processor module, and discriminates whether or not a write operation for the second shared system memory module is finished in the case where the first processor module stopped operating.

Further, preferably, the second processor module discriminates whether the write operation for the second shared system memory module is finished in normal termination or in abnormal termination.

Further, preferably, the first system bus controller of the each processor module includes a program-mode controller which controls an access utilizing a program-mode in accordance with a command from the corresponding central processing unit; a direct memory access mode (usually abbreviated to DMA-mode) controller which controls an access utilizing a direct memory access mode that allows data transfer between each processor module and one of the dual shared system memory modules; a transmission/reception circuit which exchanges data with the shared system bus; a RAM(Random Access Memory) such as a dual-port RAM which functions as a buffer circuit between the program-mode controller or the direct memory access mode controller and the transmission/reception circuit; and a register which indicates a status of the each processor module and also indicates whether or not the write operation for one of the dual shared system memory modules is being executed.

Further, preferably, the second system bus controller of each shared system memory module includes a direct memory access controller which controls an access by a direct memory access mode that allows data transfer between the each shared system memory module and one of the processor modules; a transmission/reception circuit which exchanges data with the shared system bus; and a RAM such as a dual-port RAM which functions as a buffer circuit between the direct memory access controller and the transmission/reception circuit.

Further, preferably, the second processor module reads out an address corresponding to the first data in the data which failed to be normally written, from the first shared system memory module, in the case where it is confirmed that the write operation for the second shared system memory module is finished in abnormal termination. Further, the second processor module copies the data starting from the address corresponding to the above-mentioned first data to the second shared system memory module.

In a preferred embodiment of the present invention, a monitoring operation, a discriminating operation and a copying operation of the first processor module can be performed, in either one of the case of a data transfer between the first processor module and the first and second shared system memory modules by an access mode in which a synchronous operation is executed, or the case of a data transfer by an access mode in which an asynchronous operation is executed.

In the multiprocessor system according to the present invention, a specified processor module (second processor module) among a plurality of processor modules is adapted to have a function of monitoring a status of a certain processor module (first processor module), and to discriminate whether a write operation for the second shared system memory module is finished in normal termination or in abnormal termination, even in the case where the certain processor module stopped operating and assumed HALT.

Therefore, it can be easily confirmed whether or not the processor module assuming HALT was carrying out a write access to the dual shared system memory modules and also confirmed whether or not the respective data in the dual shared system memory modules is equivalent to each other. Namely, when the write operation for the second shared system memory module is finished in normal termination, it can be made clear that a conformity of the respective data is ensured, and it becomes unnecessary to carry out a copy process. On the other hand, when such a write operation is finished in abnormal termination, it can be made clear that the respective data written in the dual shared system memory modules is not equivalent to each other.

Thus, when the second processor module discriminates that the first processor module is finished in abnormal termination, the second processor module is adapted to read out an address corresponding to the first data in the data which failed to be normally written. Further, the second processor module copies the data starting from the address corresponding to the above-mentioned first data to the second shared system memory module.

In this case, since the data corresponding to the region where an abnormality has occurred can be clearly detected, only the data related to the abnormality need to be copied. Therefore, the data amount in which a copy process is to executed, can be decreased, and it becomes possible for the time, which is required for the data recovery for ensuring that the respective data in the dual shared system memory modules is equivalent to each other, to be remarkably reduced.

In regards to the methods for carrying out a data transfer between the given processor module and the dual shared system memory modules, the following two type are mentioned: a first method is related to the data transfer by a synchronous mode which is executed by the processor module in accordance with a program of computer system; a second method is related to the data transfer by an asynchronous mode which is represented by a direct memory access mode.

The copying operation, etc., of the first processor module in the multiprocessor system according to the present invention can be executed for the both methods.

Legend

The following are abbreviations appearing in the descriptions and drawings wherein:

| | |
|---|---|
| ADRS DEC | represents "Address Decoder"; |
| ADRS GEN | represents "Address Generator"; |
| BCT | represents "Byte Count"; |
| CONT REG | represents "Control Register"; |
| DAT | represents "D-Port Active Indicator"; |
| DID | represents "Destination Identifier"; |
| EC | represents "Execution Command"; |
| EPSSAD | represents "External PM SSM Address in DMA-Mode"; |
| EPSSAP | represents "External PM SSM Address in Program-Mode"; |
| EPSTS | represents "External Processor Module Status"; |
| IBC | represents "I/O Bus Controller"; |
| IBC-P | represents "I/O Bus Controller for a Processor Module"; |
| IOBH | represents "I/O Bus Handler"; |
| LSB | represents "Least Significant Bit"; |
| MSU | represents "Main Storage Unit"; |
| PAT | represents "P-Port Active Indicator"; |
| PM | represents "PM Halt Status"; |
| REG | represents "Register"; |
| RC | represents "Response Command"; |

-continued

| | |
|---|---|
| SBC | represents "System Bus Controller"; |
| SBC-P | represents "System Bus Controller for a Processor Module"; |
| SBC-S | represents "System Bus Controlloer for a Shared System Memory Module"; |
| SBHT | represents "SBC Halt Status"; |
| SID | represents "Source Identifier"; |
| SS BUS | represents "Shared System Bus"; |
| SSBH | represents "Shared System Bus Handler"; |
| SSM | represents "Shared System Memory Module"; |
| SSMAA | represents "Shared System Memory Module-Access Address"; |
| SUCD | represents "SSM-Unmatch D-Port Indicator"; |
| SUCP | represents "SSM-Unmatch P-Port Indicator"; |
| TMG CTR | represents "Timing Controller"; and, |
| UID | represents "Unit Identifier". |

BRIEF DESCRIPTION OF THE DRAWINGS

The above object and features of the present invention will be more apparent from the following description of the preferred embodiments with reference to the accompanying drawings, wherein:

FIG. 11A is a diagram for explaining the operation of data transfer on the bus for a read access in an embodiment according to the present invention;

FIG. 11B is a diagram for explaining the operation of data transfer on the bus for a usual write access in an embodiment according to the present invention;

FIG. 16 is a flowchart for explaining the operation of an embodiment according to the present invention.

DESCRIPTION OF THE PREFERRED EMBODIMENTS

Before describing an embodiment of the present invention, the related art and the disadvantages therein will be described with reference to the related drawings of FIGS. 1 to 3.

Figure 1:
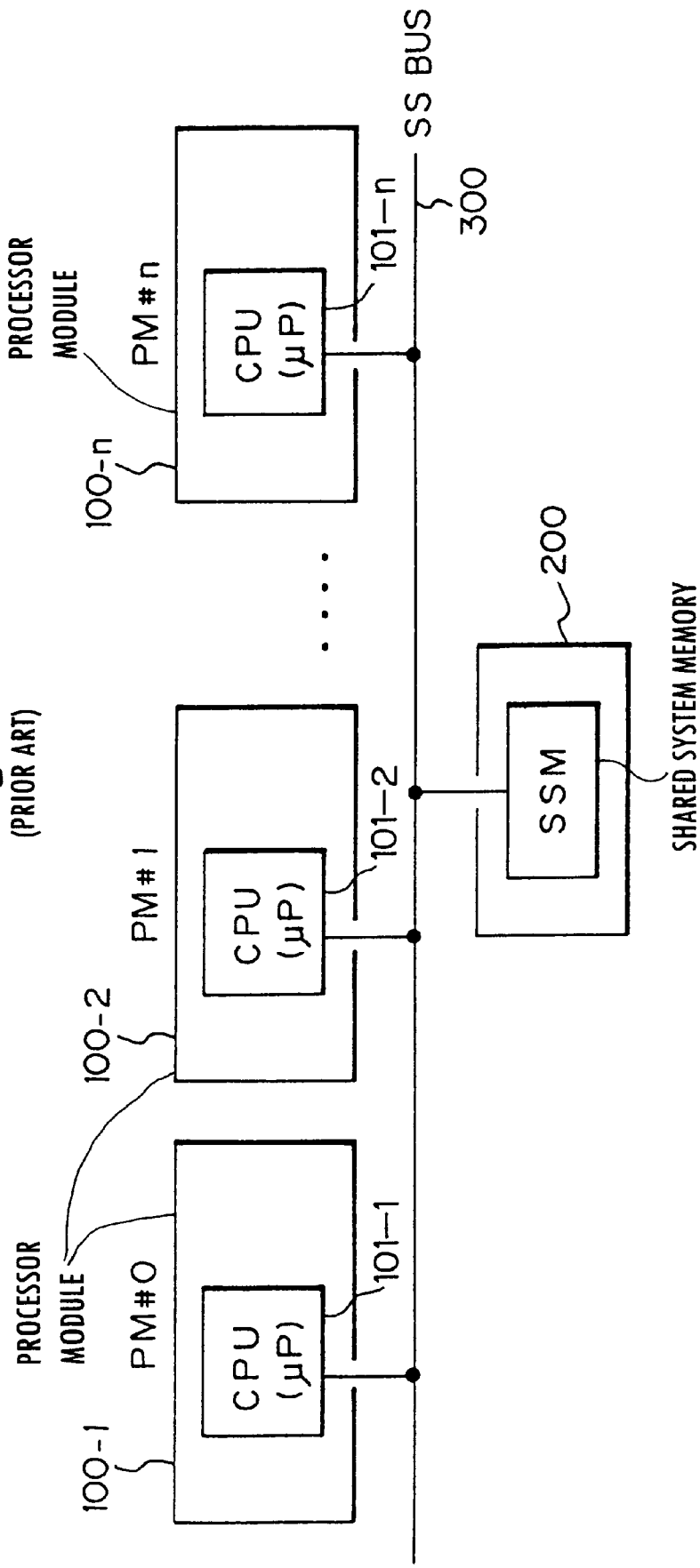
FIG. 1 is a schematic block diagram showing a tightly coupled multiprocessor system of a conventional type.

FIG. 1 is a schematic block diagram showing a tightly coupled multiprocessor system of a conventional type; FIG. 2 is a schematic block diagram showing a loosely coupled multiprocessor system of a conventional type.

In a tightly coupled multiprocessor system (TCMP) shown in FIG. 1, a plurality of processor modules 100-1, 100-2, ..., 100-n (PM #0, #1, ..., #n) are coupled to one shared system memory module (SSM) in a shared memory device 200, through a shared system bus (SS BUS) 300. In this case, all the programs and data in a plurality of central processing units (CPU or μP) 101-1, 101-2, ..., 101-n are stored in the shared system memory module. Also, data communication between processor modules is carried out through the shared system memory module.

Such a tightly coupled multiprocessor system have an ability for processing the data higher than that in a single processor with a simple construction, by effectively utilizing a plurality of central processing units. Further, since the data communication between different CPUs can be executed via only one memory module, it becomes unnecessary to carry out an excess data process for data transfer between these processor modules and various kinds of memory modules, in the case where these memory modules are provided within the multiprocessor system.

However, in this construction, since all the data is processed through a single shared system memory module, it is likely to take a relatively long time to transfer a large amount of data. In other words, since all the processor modules carry out the access of the same data to a single shared system memory module, an ability to transfer data by a shared system bus is likely to be limited to some extent, as the number of processor modules connected to the shared system bus increases.

Figure 2:
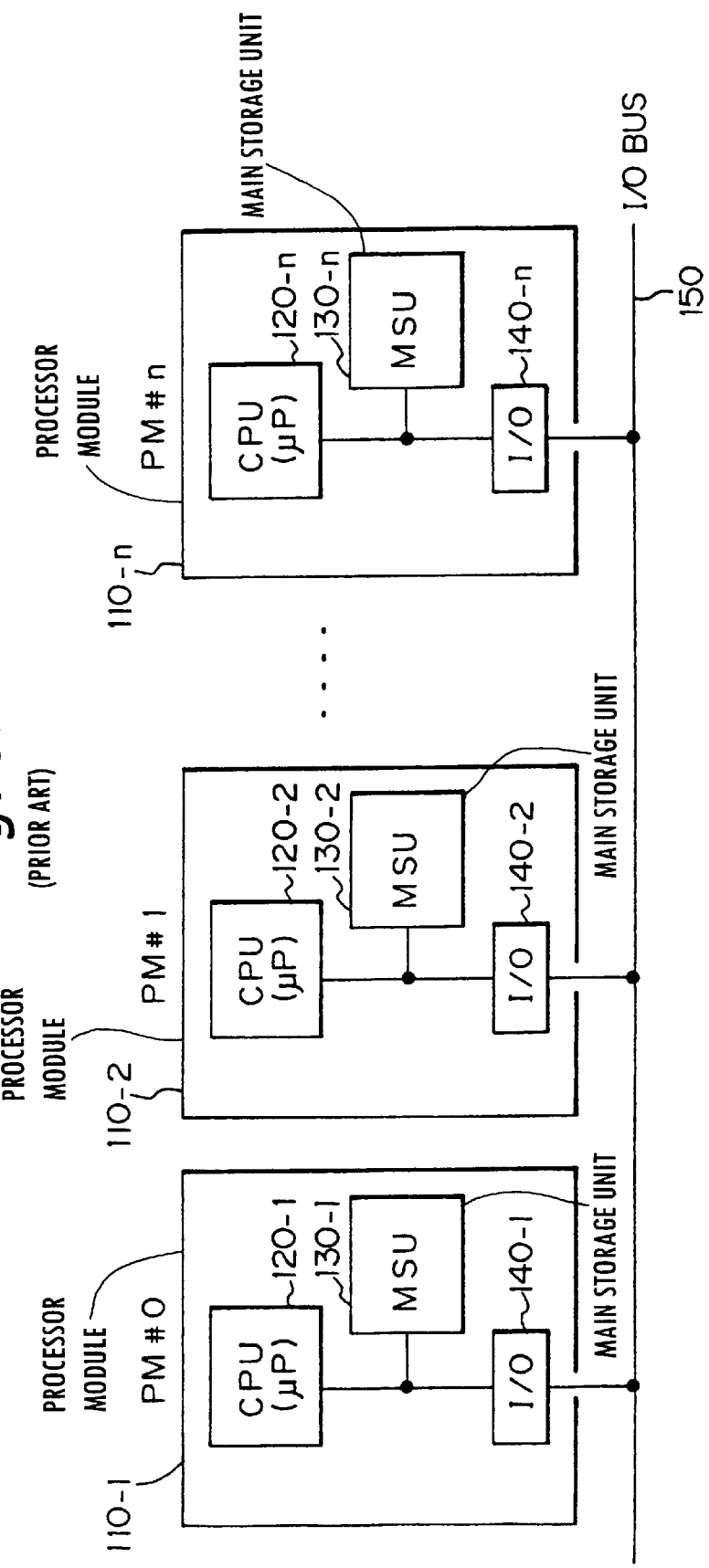
FIG. 2 is a schematic block diagram showing a loosely coupled multiprocessor system of a conventional type.

On the other hand, in a loosely coupled multiprocessor system (LCMP) shown in FIG. 2, a plurality of processor modules 110-1, 110-2, ..., 110-n (PM #1, #1, ..., #n) have respectively corresponding central processing units 120-1, 120-2, ..., 120-n and a plurality of main storage units (MSU) 130-1, 130-2, ..., 130-n which are exclusively used by the respective central processing units 120-1, 120-2, ..., 120-n. In this case, all the programs and data in a plurality of central processing units 120-1, 120-2, ..., 120-n are stored in the respectively corresponding main storage units (MSU) 130-1, 130-2, ..., 130-n. Generally, data communication between processor modules is carried out through the respective I/O (input/output) channels 140-1, 140-2, ..., 140-n, an I/O bus 150, and other communication ports.

In such a construction, an ability for processing the data become higher than the case of tightly coupled multiprocessor system, since the memory capacity in each central processing unit increases. Further, all the processor modules individually have local memories such as main storage units, an contention of a single shared system memory module does not occur between different processor modules, unlike the case of a tightly coupled multiprocessor system.

However, in this construction, since the data communication between different processor modules has to be carried out via respective I/O channels and other communication port, the multiprocessor system is likely to have a lot of overhead time necessary for exchanging data with the CPUs and the I/O channels, etc.

Figure 3:
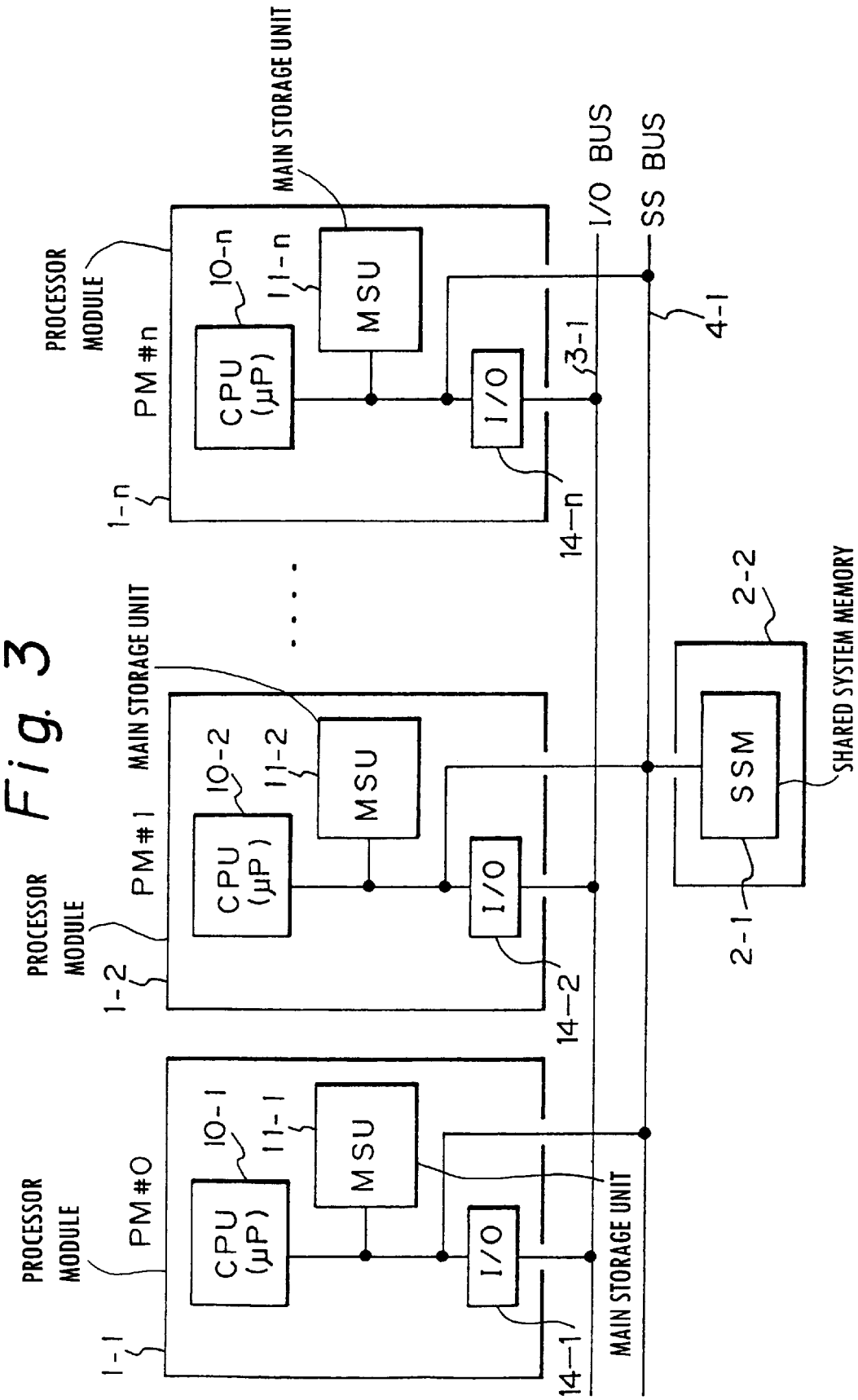
FIG. 3 is a schematic block diagram showing a multiprocessor system related to the present invention.

FIG. 3 is a schematic block diagram showing a multiprocessor system related to the present invention. In FIG. 3, a plurality of processor modules 1-1, 1-2, . . . , 1-n (PM #0, #1, . . . , #n) have respectively corresponding central processing units 10-1, 10-2, . . . , 10-n and a plurality of main storage units (MSU) 11-1, 11-2, . . . , 11-n which are exclusively used by the respective central processing units 10-1, 10-2, . . . , 10-n, similar to the case of FIG. 2. Further, data communication between processor modules is carried out through the respective I/O (input/output) channels 14-1, 14-2, . . . , 14-n or other communication ports.

Further, in FIG. 3, one shared system memory module (SSM) 2-1 in a shared memory device 2-2 is connected to a shared system bus 4-1, to support data communication with relatively high speed.

Generally, the number of the processor modules, which can be incorporated into a loosely coupled multiprocessor system, is much greater than the case of a tightly coupled multiprocessor system. In view of this, a multiprocessor system of the present invention is constructed to be related to such a loosely coupled multiprocessor system shown in FIG. 2. Further, by taking the feature of the tightly coupled multiprocessor system into consideration, the multiprocessor system, which is closely related to the present invention, has been conceived, as illustrated in FIG. 3. Further, the present invention is intended to have redundancy also in shared system memory configuration by providing a plurality of shared system memory modules.

The above-mentioned multiprocessor system shown in FIG. 3 has a redundant configuration in regard to both the processors and the shared system memory modules, which can provide a fault tolerant computer system.

Further, such a multiprocessor system also has extensible characteristics in which a desired performance can be provided in accordance with an ability required by a user.

Hereinafter, the description of a preferred embodiment according to the present invention will be given with reference to the accompanying drawings.

Figure 4:
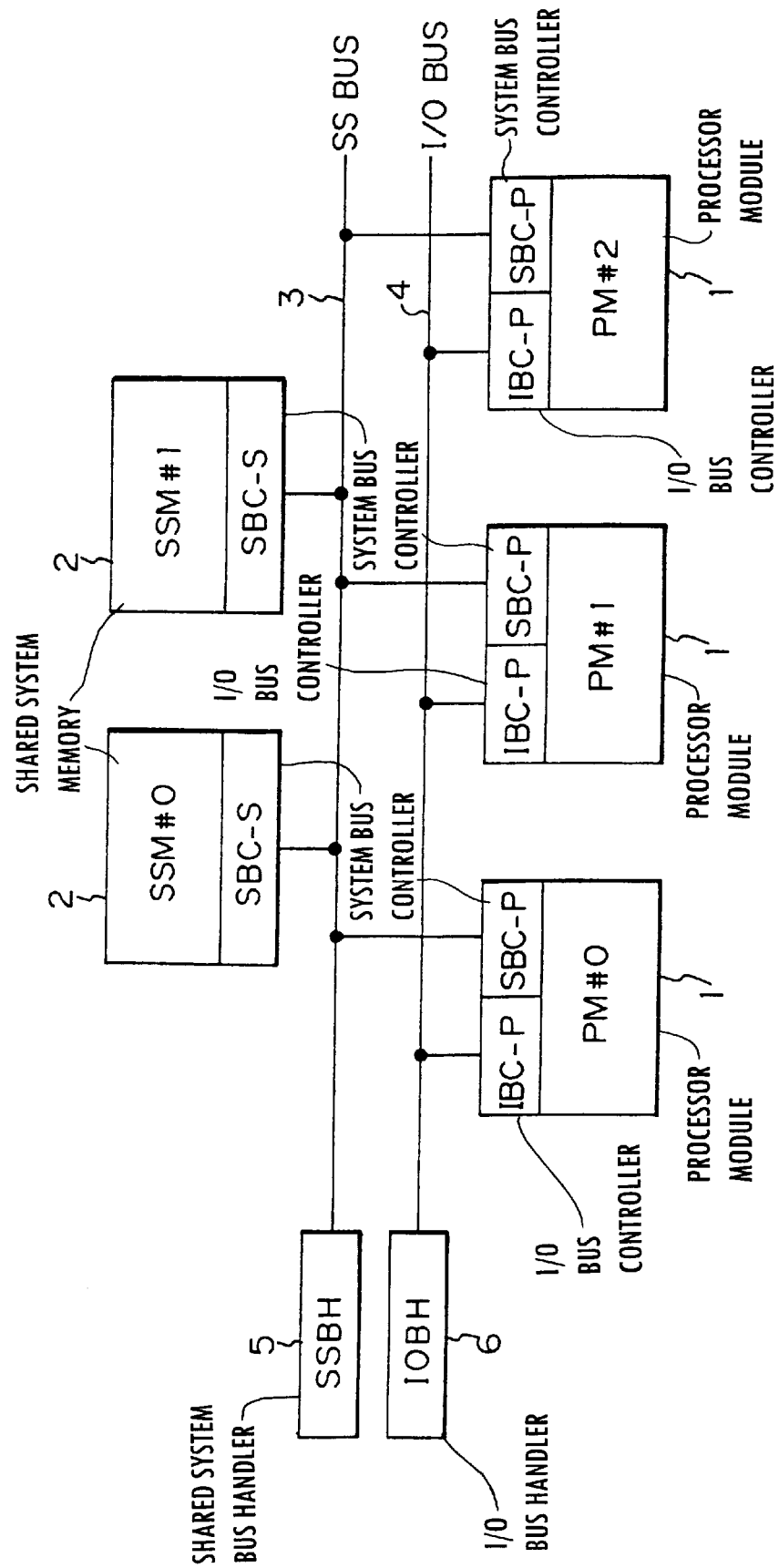
FIG. 4 is a block diagram showing a multiprocessor system of an embodiment according to the present invention.

FIG. 4 is a block diagram showing a multiprocessor system of an embodiment according to the present invention. In this case, a main part of a multiprocessor system having a dual shared memory configuration will be illustrated.

In FIG. 4, the multiprocessor system includes a plurality of processor modules (PM) 1, e.g., three processor modules, and a pair of shared system memory modules (SSM) 2. Further, each of three processor modules 1 and a pair of shared system memory modules 2 are connected to a shared system bus (SS BUS) 3, through a first system bus controller for a processor module (SBC-P) and a second system bus controller for a shared system memory module (SBC-S), respectively.

The shared system bus 3 is controlled by a shared system bus handler (SSBH) 5. Namely, an arbitration on the shared system bus 3 concerning various data and various commands is concentratively managed by a shared system bus handler (SSBH) 5.

Further, each processor module 1 is connected to an input/output bus (usually abbreviated to I/O bus) 4, through an I/O bus controller for a processor module (IBC-P). Also, the I/O bus 4 is controlled by an I/O bus handler (IOBH) 6, similar to the case of the shared system bus 3. Namely, an arbitration on the I/O bus 4 concerning various data and various commands is concentratively managed by an I/O bus handler 6.

The shared system bus 3 is generally used for carrying out an access to the shared system memory modules 2 by each processor module 1. On the other hand, the I/O bus 4 is generally used for carrying out an access to an external device by each processor module 1 and also used for an access between the three processor modules 1.

Figure 5:
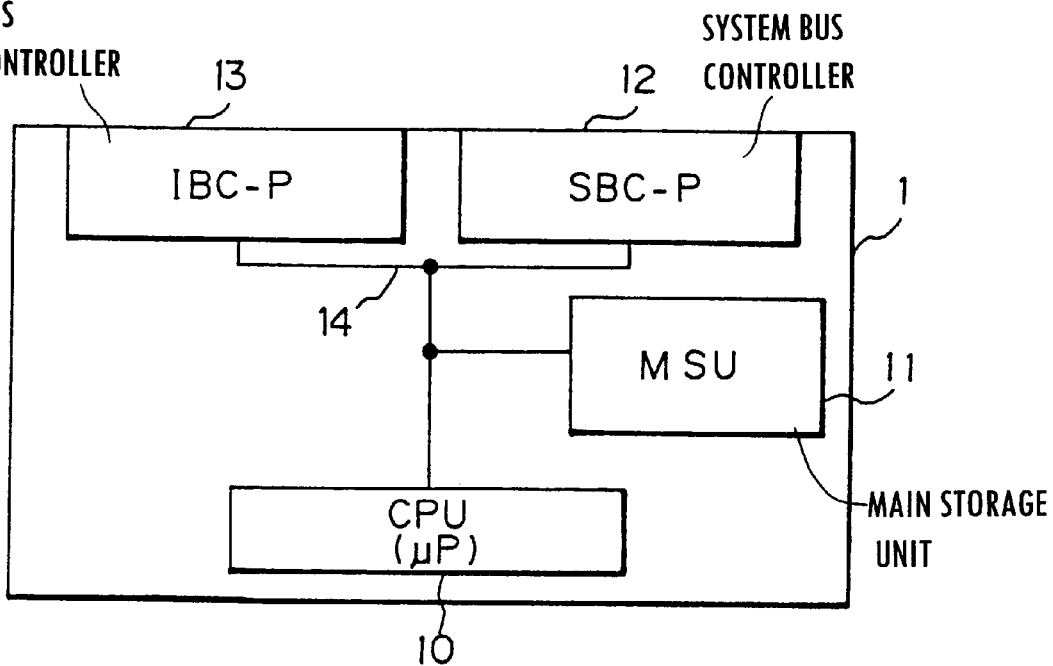
FIG. 5 is a block diagram showing the construction of one of processor modules in FIG. 4.

FIG. 5 is a block diagram showing the construction of one of processor modules in FIG. 4. Hereinafter, any component that is the same as that mentioned before will be referred to using the same reference number.

As shown in FIG. 5, each processor module 1 includes a central processing unit (CPU or $\mu$P) 10 for processing various data; a main storage unit (MSU) 11 which is inherently provided in each processor module 1; a first system bus controller for processor module (SBC-P) 12 for connecting each processor module 1 to the shared system bus 3; and an I/O bus controller for a processor module (IBC-P) 13 for connecting each processor module 1 to I/O bus 4. The CPU, the main storage unit 11, the first system bus controller for processor module 12, and an I/O bus controller for a processor module 13 are connected to each other, through an internal bus 14.

Figure 6:
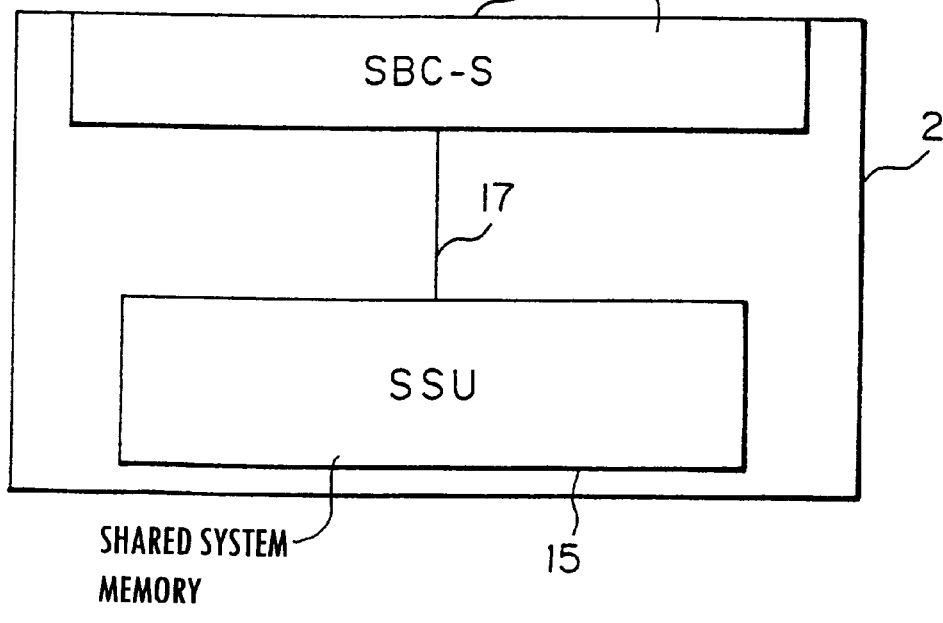
FIG. 6 is a block diagram showing the construction of one of shared system memory modules in FIG. 4.

FIG. 6 is a block diagram showing the construction of one of shared system memory modules in FIG. 4.

As shown in FIG. 6, each shared system memory module 2 includes a shared system memory unit (SSU) 15 which can be used in common by a plurality of processor modules 1; and a second system bus controller for a shared system memory module (SBC-S) 16 for connecting each shared system memory module 2 to a shared system bus 3. The shared system memory unit 15 and the second system bus controller for a shared system memory module 16 are connected to each other, through another internal bus 17. The data, which has to be shared by a plurality of processor modules 1, is stored in each shared system memory module 2.

Figure 7:
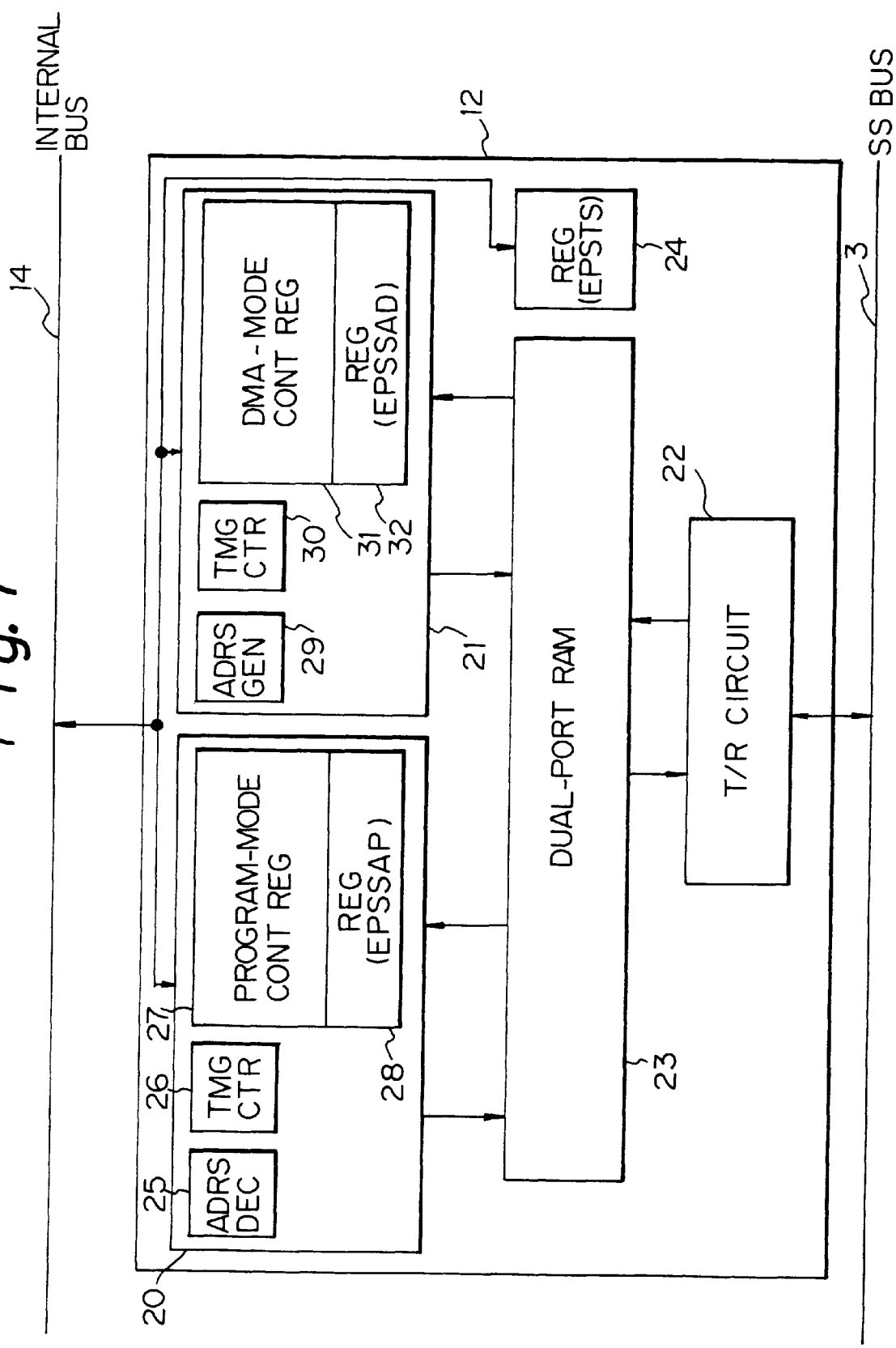
FIG. 7 is a block diagram showing the construction of a first shared system bus controller provided in each processor module illustrated in FIG. 5.

FIG. 7 is a block diagram showing the construction of a first shared system bus controller provided in each processor module illustrated in FIG. 5.

As shown in FIG. 7, a first shared system bus controller for a processor module (SBC-P) 12 carries out the following two kinds of access operations for each shared system memory module 2, through a shared system bus 3.

(1) first, an access which is executed by a command from a CPU 10 and carried out in accordance with a program mode on the basis of software directly by using physical addresses.

(2) second, an access which is carried out in accordance with a DMA-mode, by selecting a specified shared system memory module 2, and defining an access address in the specified shared system memory module 2 and a length of transferred data, and executing data transfer between a plurality of processor modules 1 and the specified shared system memory module 2.

Corresponding to the above-mentioned two kinds of access operations, a first shared system bus controller for a processor module (SBC-P) 12 includes a program-mode controller 20 which controls an access utilizing a program-mode in accordance with a command from the corresponding CPU 10; a DMA-mode controller 21 which controls an access utilizing a DMA-mode which allows data transfer between each processor module 1 and one of the shared system memory modules 2; a transmission/reception circuit 22 which exchanges data with a shared system bus 3; a dual-port RAM 23 which functions as a buffer circuit between the program-mode controller 20 or the DMA-mode controller 21 and said transmission/reception circuit 22; and a register for external PM status (EPSTS) which indicates a status of said each processor module and also indicates whether or not the write operation for one of shared system memory modules is being executed.

Further, in FIG. 7, the program-mode controller 20 includes an address decoder (ADRS DEC) 25, a timing controller (TMG CTR) 26, a program-mode control register (PROGRAM-MODE CONT REG) 27, and a register for SSM address in a program-mode of external PM (EPSSAP) 28 which indicates a final address in one of the shared system memory modules 2 when a processor module 1 assumes HALT.

Further, in FIG. 7, the DMA-mode controller 21 includes an address generator (ADRS GEN) 29, a timing controller (TMG CTR) 30, a DMA-mode control register (DMA-MODE CONT REG) 31, and a register for SSM address in a DMA-mode of external PM (EPSSAD) 32 which indicates a final address in one of the shared system memory modules 2 when a processor module 1 assumes HALT.

Here, the above-mentioned timing controller 26, 30 have the following three functions:

(1) a first function in which an access to the dual-port RAM 23 is controlled;

(2) a second function in which a timing control of the dual-port RAM 23 per se is executed; and (3) a third function in which a timing control of control signals on the internal bus 14 is executed, in the case where a transmission/reception of data between the timing controller 26, 30 and the internal bus 14 is carried out.

Figure 8:
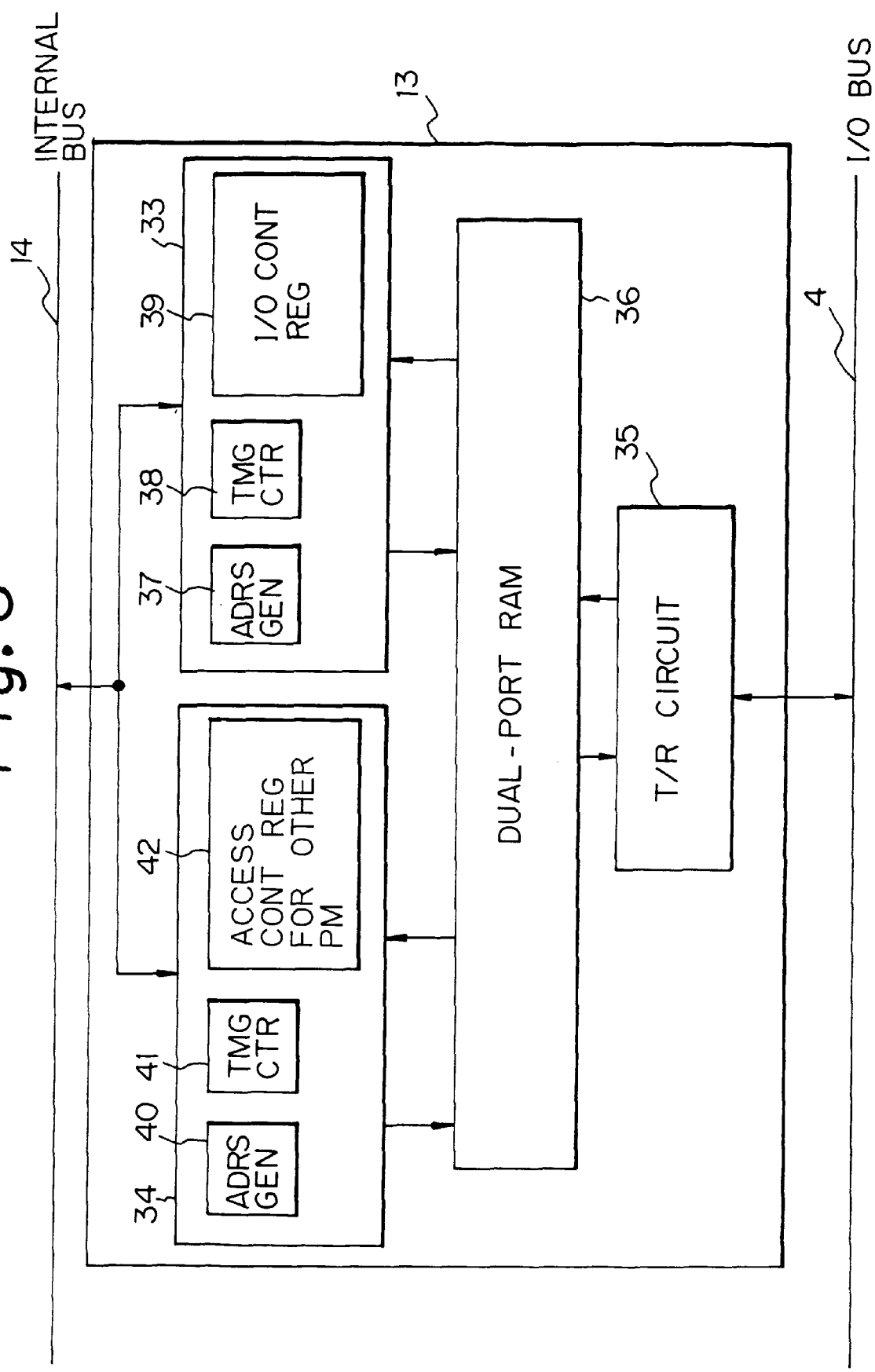
FIG. 8 is a block diagram showing the construction of an I/O bus controller provided in each processor module illustrated in FIG. 5.

FIG. 8 is a block diagram showing the construction of an I/O bus controller provided in each processor module illustrated in FIG. 5.

As shown in FIG. 7, an I/O bus controller for a processor module (IBC-P) 13 carries out the following two kinds of access operations through an I/O bus 4:

(1) first, an I/O access to an external device; and (2) second, an access to any other processor module 1.

Corresponding to the above-mentioned two kinds of access operations, an I/O bus controller for a processor module (IBC-P) 13 includes an I/O access controller 33; an access controller 34 for the other processor module 1; a transmission/reception circuit 35 which exchanges data with an I/O bus 4; and a dual-port RAM 36 which functions as a buffer circuit between the two access controllers 33, 34 and the transmission/reception circuit 35.

Further, in FIG. 8, the I/O access controller 33 includes an address generator (ADRS GEN) 37, a timing controller (TMG CTR) 38, and an I/O control register (I/O CONT REG) 39.

Further, in FIG. 8, the access controller 34 for the other processor module 1 includes an address generator (ADRS GEN) 40, a timing controller (TMG CTR) 41, and an access control register 42 for the other processor module 1.

Figure 9:
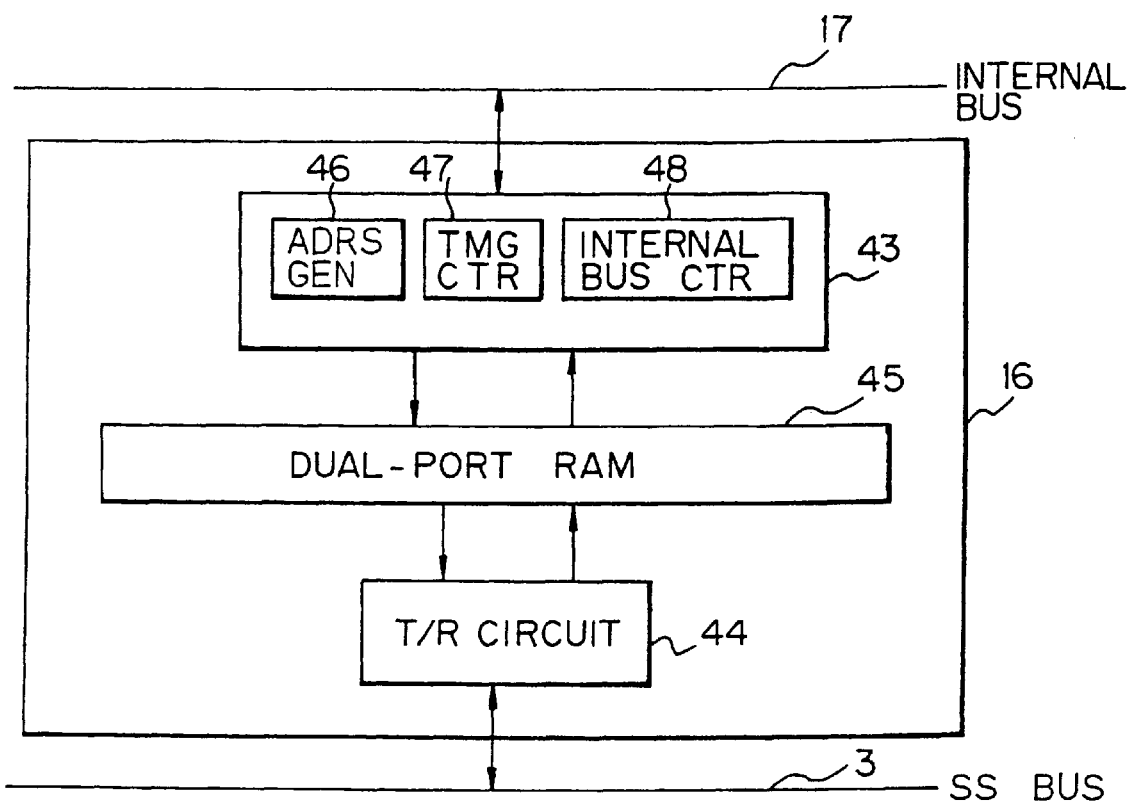
FIG. 9 is a block diagram showing the construction of a second shared system bus controller provided in each shared memory module illustrated in FIG. 6.

FIG. 9 is a block diagram showing the construction of a second shared system bus controller provided in each shared memory module illustrated in FIG. 6.

As shown in FIG. 9, a second system bus controller for a shared system memory module 16 includes a DMA controller 43; a transmission/reception circuit 44 which exchanges data with a shared system bus 3; and a dual-port RAM 45 which functions as a buffer circuit between the DMA controller 43 and the transmission/reception circuit 44. Further, the DMA controller 43 includes an address generator (ADRS GEN) 46, a timing controller (TMG CTR) 47, and an internal bus controller (INTERNAL BUS CTR) 48.

In carrying out the bus control for a shared system bus 3 and an I/O bus 4, a unit identifier (UID) is allocated for each processor module 1 and each shared system memory module 2, and such a unit identifier is defined as an identifier of each module on the bus.

Figure 10:
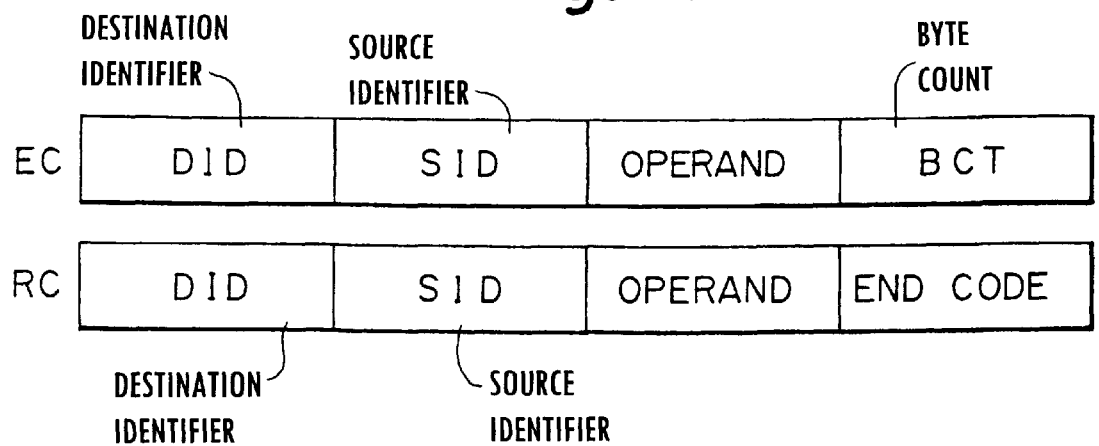
FIG. 10 is a diagram for explaining a format of each pair of an execution command and a response command.

FIG. 10 is a diagram for explaining a format of each pair of an execution command and a response command. In the upper part of FIG. 10, an example of a format of execution command (EC) for sending an access command from a certain processor module to a specified shared system memory module is illustrated in one frame.

On the other hand, in the lower part thereof, an example of a format of response command (RC) for informing the certain processor module that an access is executed in response to the above-mentioned execution command is illustrated in one frame.

In the format of execution command (EC), a DID denotes a destination identifier which means a unit identifier of a module in the reception side. An SID denotes a source identifier which means a unit identifier of a module in the transmission side. An operand address indicates a type of access operation. In regards to the types of access operations, a memory access, an I/O access, an access by various control registers for reset command to each shared system memory module 2 or any other processor modules 1, and the like can be mentioned.

Further, a BCT denotes a byte count which means data amount required for each access. A DID and an SID in the response command (RC) are similar to those in execution command (EC), respectively. Further, an END CODE in the response command (RC) indicates a state of termination in the specified shared system memory module to which an access is executed, at the time when an access is finished. More specifically, it is informed by the END CODE whether or not an access is finished in normal termination or in abnormal termination. Also, in the case where an access is finished in abnormal termination, an error mode related to such an abnormal termination is made known by using the corresponding error message code.

FIG. 11A is a diagram for explaining the operation on data transfer on the bus for a read access in an embodiment according to the present invention.

In FIG. 11A, first of all, a processor module 1 in the transmission side, from which a read access command is to be sent, generates an execution command (EC). More specifically, this execution command is generated by an SID (Source UID) indicating a UID of the processor module 1 per se, an DID (Destination UID) indicating a UID of a shared system memory module 2 to which a read access is executed, an operand address indicating a read access for the shared system memory module 2, and BCT indicating data amount transferred for a read access. Further, the thus generated execution command is transferred to the shared system memory module 2 of destination, through a shared system bus 3. Subsequent to the execution command, an access address (A) on the shared system memory module 2 to which a read access is executed, is transferred.

On the other hand, a shared system memory module 2 in the reception side monitors a shared system bus 3, and compares the DID of the shared system memory module included the execution command with a UID indicated by a shared system memory module in the reception side. In the case where the above two identifiers (ID) conform to each other, a receiving operation is carried out by the shared system memory module 2. Further, the shared system memory module 2, which carried out this receiving operation, executes a read access to a shared system memory unit 15 in the shared system memory module 2.

Further, after a read access to the shared system memory unit 15 is finished, the shared system memory module 2 generates a response command (RC) including an END CODE for a read access. Here, the response command is generated by changing the DID and SID included in the execution command with each other, since a direction of data transfer in an execution command is opposite to that in a response command and therefore a relationship between a transmission side and a reception side is reversed. Further, the thus generated response command is transferred back to the processor module 1 from which a read command is sent, through a shared system bus 3. Subsequent to the response command, a read data (D) is transferred from the shared system memory module 2 to which the processor module 1.

The processor module 1 in the reception side, from which a read command has been sent before, monitors a shared system bus 3, and compares the DID of the processor module included the response command with a UID indicated by the processor module in the reception side. In the case where the above two identifiers (ID) conform to each other, a receiving operation is carried out by the processor module 1, and thus a first read access is finished. In this case, spare time exists corresponding to an interval between when the time a transmission of the execution command is finished and the time when a transmission of the response command is started. This spare time can be utilized for an access from some other processor module 1 to a shared system memory module 2.

FIG. 11B is a diagram for explaining the operation of data transfer on the bus for a usual write access in an embodiment according to the present invention.

In FIG. 11B, first of all, a processor module 1 in the transmission side, from which a write access command is to be sent, generates an execution command (EC). More specifically, this execution command is generated by an SID indicating a UID of the processor module 1 per se, an UID indicating a DID of a shared system memory module 2 to which a write access is executed, an operand address indicating a write access for the shared system memory module 2, and BCT indicating data amount transferred for a write access. Further, the thus generated execution command is transferred to the shared system memory module 2 of destination, through a shared system bus 3. Subsequent to the execution command, an access address (A) on the shared system memory module 2 to which a write access is executed, and a write data (D), are transferred.

On the other hand, a shared system memory module 2 in the reception side monitors a shared system bus 3, and compares a DID of the shared system memory module included the execution command with a UID indicated by a shared system memory module in the reception side. In the case where the above two identifiers (ID) conform to each other, a receiving operation is carried out by the shared system memory module 2. Further, the shared system memory module 2, which carried out this receiving operation, executes a write access to a shared system memory unit 15 in the shared system memory module 2.

Further, after a write access to the shared system memory unit 15 is finished, the shared system memory module 2 generates a response command (RC) including an END CODE for a write access. Here, the response command is generated by changing the DID and SID included in the execution command with each other, since a direction of data transfer in an execution command is opposite to that in a response command and therefore a relationship between a transmission side and a reception side is reversed. Further, the thus generated response command is transferred back to the processor module 1 from which a write command is sent, through a shared system bus 3.

The processor module 1 in the reception side, from which a write command has been sent before, monitors a shared system bus 3, and compares a DID of the processor module included the response command with a UID indicated by the processor module in the reception side. In the case where the above two identifiers (ID) conform to each other, a receiving operation is carried out by the processor module 1, and thus a first write access is finished.

Figure 12:
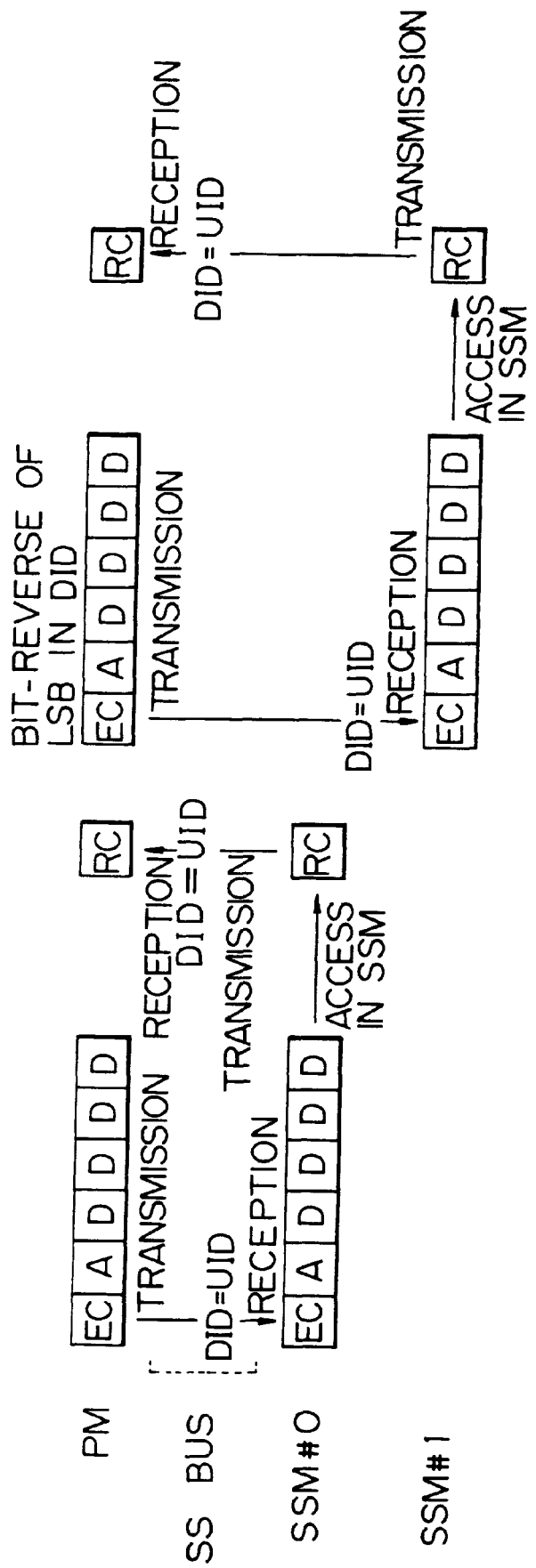
FIG. 12 is a diagram for explaining the operation of data transfer on the bus for a dual write access in an embodiment according to the present invention.

FIG. 12 is a diagram for explaining the operation of data transfer on the bus for a dual write access in an embodiment according to the present invention.

In regards to such a dual write access, a first write access is carried out in the same method as a usual write access shown in FIG. 11B as described before. However, after a first write access is normally finished, it should be noted that a digital value of a least significant bit (usually abbreviated to LSB) in a DID is reversed (0→1 or 1→0) and thereafter a second write access to dual shared system memory modules 2 is carried out.

Here, the reason for reversing the value of a least significant bit in a DID will be described.

Generally, a multiprocessor system having a redundant shared memory configuration is constituted by a plural pairs of dual shared system memory modules 2, so that a fault tolerant computer system can be established more completely. When some data has to be written in a certain pair of the dual shared system memory modules 2, it becomes necessary for all the processor modules 1 to easily discriminate each pair of dual shared system memory modules 2, by using a certain method, e.g., by means of bit-reverse of LSB in DID as mentioned above. By virtue of the bit-reverse of LSB in DID, any one of processor modules can write data in one of a given pair of dual shared system memory modules and subsequently write the same data in the other one of the given pair, without a necessity for the excess time for finding the remaining one of the pair of memory modules.

For example, it is assumed that a bit data of DID in one of a given pair of dual shared system memory modules 2 is "100", and that a bit data of DID in the other one of the given pair thereof is "101". In such a construction of the bit data of DID, by reversing the value of a least significant bit in the former bit data "100", the latter bit data "100" can be easily obtained.

In regards to the methods for carrying out an access from a certain processor module 1 to dual shared system memory modules 2, the following two methods can be mentioned: a first method by a program-mode access in which a synchronous operation is executed; a second method by a DMA-mode in which an asynchronous operation is executed. The method by a program-mode access is only different from another method by a DMA-mode, in the sequences for data process in a first system bus controller (SBC-P) 12 in a processor module 1. Namely, in both methods for carrying out an access, the operations on the shared system bus 3 and other operations in the dual shared system memory modules 2 are substantially the same. Further, in both methods, the access operations on an I/O bus 4 are fundamentally the same.

Figure 13A:
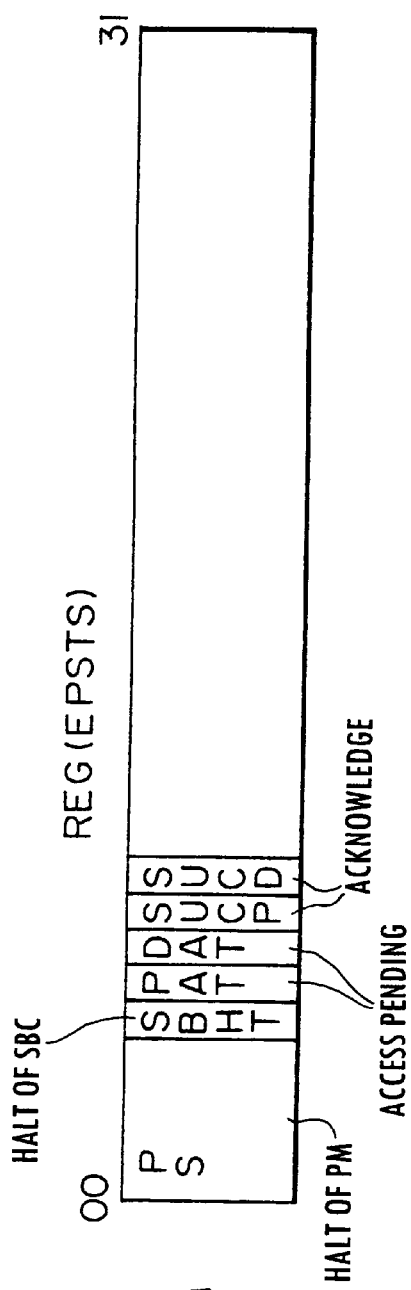
FIGS. 13A, 13B and 13C are diagrams respectively showing the contents of various status which three kinds of registers (EPSTS, EPSSAP and EPSSAD) indicate in FIG. 7.
Figure 13B:
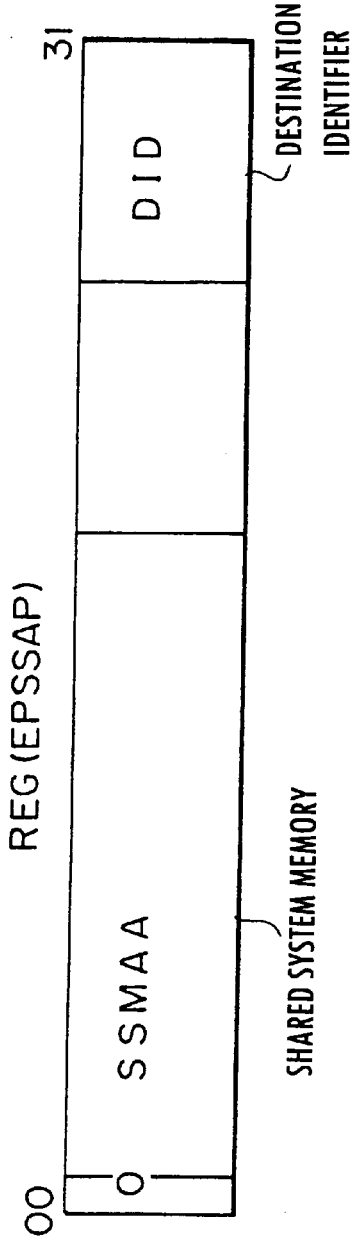
Figure 13C:
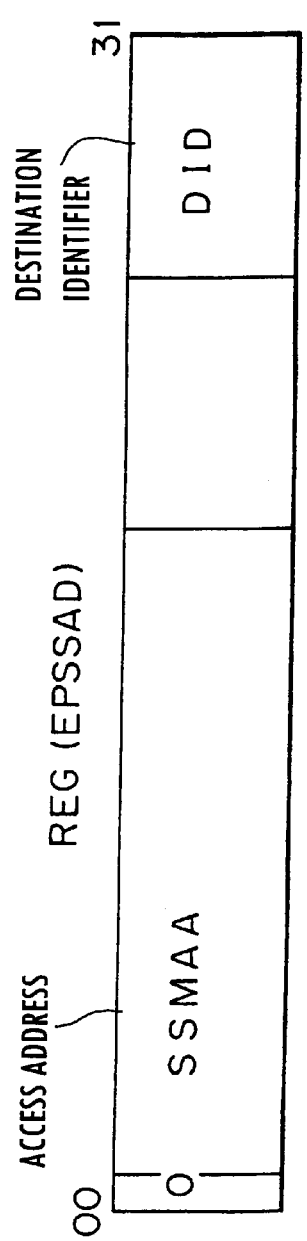

FIGS. 13A, 13B and 13C are diagrams respectively showing the contents of various status which three kinds of registers (EPSTS, EPSSAP and EPSSAD) indicated in FIG. 7.

First, the contents of various status indicated by the register for external processor module status (EPSTS) as described in FIG. 7 will be described in detail with reference to FIG. 13A.

(1) PS (PM HALT) indicates the present status of a given processor module 1 from which an access command is to be sent. Namely, the PS informs whether or not the given processor module 1 stopped operating and assumes HALT by representing the present status in "0" or "1".

(2) SBHT (SBC HALT) indicates the present status of a first system bus controller (SBC-P) 12 in the given processor module 1. Namely, the SBHT informs whether or not the SBC-P 12 stopped operating and assumes HALT by representing the present status.

(3) PAT (P-PORT ACTIVE) indicates whether or not an access operation of the given processor module 1 by a program-mode access is being carried out presently (i.e. whether or not P-port is active).

(4) DAT (D-PORT ACTIVE) indicates whether or not an access operation of the given processor module 1 by a DMA-mode is being carried out presently(i.e., whether or not D-port is active).

(5) SUCP (SSM-UNMATCH P-PORT) indicates whether or not the respective data written in a pair of shared system is matched to each other and a conformity of the respective data is ensured, in the case where the data is written in the dual shared system memory modules 2 finally by a program-mode access.

(6) SUCD (SSM-UNMATCH D-PORT) indicates whether or not the respective data written in a pair of shared system is matched to each other and a conformity of the respective data is ensured, in the case where the data is written in the dual shared system memory modules 2 finally by a DMA-mode.

Before describing the other two registers ( EPSSAP 28 and EPSSAD 32) illustrated in FIGS. 13B and 13C, an interrelationship between a plurality of processor modules 1 will be explained more concretely.

Figure 14:
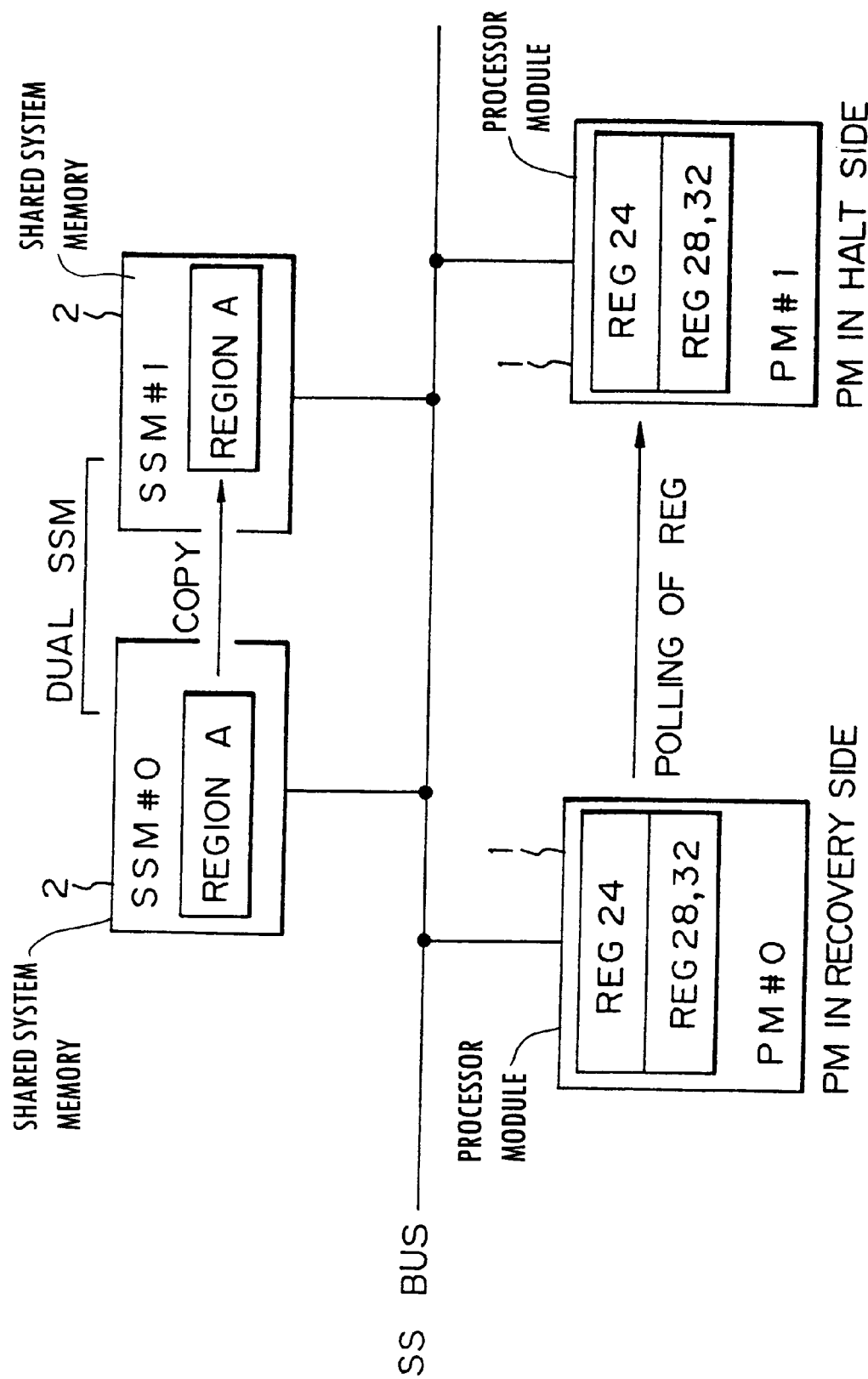
FIG. 14 is a block diagram showing an interrelationship between a plurality of processor modules which are connected to each other in an embodiment according to the present invention.

FIG. 14 is a block diagram showing an interrelationship between a plurality of processor modules which are connected to each other in an embodiment according to the present invention.

In FIG. 14, a processor module 1 (PM #0) connected to a multiprocessor system is operative to carry out a polling against three kinds of registers (EPSTS 24, EPSSAP 28 and EPSSAD 32) of another processor module 1 (PM #1) also connected to the multiprocessor system, and vice versa.

However, in the case where the number of processor modules 1 is increased to some extent, it is preferable to provide a master processor module 1 which carry out a polling against the registers (EPSTS 24, EPSSAP 28 and EPSSAD 32) of all the other processor modules. Further, in this case, only one of the other processor modules is adapted to carry out a polling against the registers of the master processor module 1.

Here, a register for external processor module status (EPSTS) 24 indicates the present status of a specified processor module 1 having the corresponding register 24. Namely, the register (EPSTS) 24 informs whether or not the specified processor module 1 assumes HALT while an access to dual shared memory modules 2 (SSM #0 and SSM #1) is carried out by dual access mode. Further, a register for SSM address in a program-mode of external PM (EPSSAP) 28 indicates a shared memory module 2 to which an access is finally carried out by a program-mode and the internal address of this shared memory module 2. Also, a register for SSM address in a DMA-mode of external PM (EPSSAD) 32 indicates a shared memory module 2 to which an access is finally carried out by a DMA-mode and the internal address of this shared memory module 2.

The above-mentioned master processor module 1 carries out a polling against the registers (EPSTS 24, EPSSAP 28 and EPSSAD 32) of all the other processor modules at a predetermined intervals, and determines whether any one of the other processor modules having the corresponding registers normally operates or it assumes HALT. Further, in the case where the processor module assumes HALT, it is determined whether or not a conformity of the respective data in dual shared system memory modules 2, to which an access is carried out by the processor module assuming HALT, is finally ensured.

As mentioned above, PAT/DAT is a register portion for indicating that the corresponding processor module 1 is being carried out presently, by a program-mode access or by a DMA-mode. If the processor module 1 having this register portion (PAT/DAT) assumes HALT, it means that an access to a specified dual shared system memory modules are not newly carried out by the processor module 1.

However, in this case, the processor module 1 may be in a state of "WAIT" indicating that the processor module 1 waits for a response command transferred from the specified dual shared system memory modules. It cannot be confirmed whether or not the respective data written in the specified dual shared system memory modules 2 by dual access mode is equivalent to each other, until an access operation of the processor module 1 is finished. More specifically, when it is informed by the END CODE included in a response command whether or not an access is finished in normal termination, it becomes clear that the respective data in the dual shared system memory modules 2 is assuredly equivalent to each other. Accordingly, the PAT/ DAT is utilized for allowing the given processor module 1 to continue to assume a state of "WAIT".

In the case where SBHT indicates that a first system bus controller (SBC-P) 12 assumes HALT, it is apparent that such a state occurs because the SBC-P 12 has found an inconsistency included in itself (self-inconsistency). In this case, it becomes impossible to determine whether or not the respective data in the dual shared system memory modules 2 is assuredly equivalent to each other. Therefore, in carrying out a data recovery process in the case where the SBC-P 12 assumes HALT, it becomes necessary to copy all the regions of one of dual shared system memory modules 2 (SSM #0) to the other one of dual shared system memory modules 2 (SSM #1). Here, it should be noted that a region A in one data block (e.g., 4 kByte data block) in each system memory module is illustrated representatively.

As an example of the self-inconsistency brought about by the SBC-P 12 per se, an abnormality of an internal sequencer or a state machine can be mentioned.

Generally, each LSI (Large Scale Integrated Circuit) includes a circuit portion for checking the operation of the LSI per se, and always monitors a present status thereof. Once such a self-inconsistency has occurred, even in the case where the SBC-P 12 does not send a command to a shared system bus (SS BUS) 3, the SBC-P 12 is likely to inform a central processing unit 10 that an access operation is finished in normal termination. Further, the SBC-P 12 is also likely to carry out an excess write access. Namely, the SBC-P 12 becomes out of control, and therefore it becomes impossible to determine a conformity of the data in the dual shared system memory modules.

In the redundant memory configuration of the preferred embodiment according to the present invention shown in FIG. 14, a write operation by a dual access mode is carried out, by writing data in one of dual shared system memory modules and subsequently writing the data in the other one thereof. In this case, a relation between the SUCP/SUCD and the state of the write operation of the respective write operation in the shared system memory modules (SSM #0, #1) is as follows:

| SUCP/SUCD | data in SSM # 0 | data in SSM # 1 |
|---|---|---|
| 0 | not written | not written |
|   | normally written | normally written |
| 1 | fail to be written | not written |
|   | normally written | fail to be written |

As apparent from the above-mentioned list, the embodiment of the present invention can be utilized effectively, especially in the case where data is normally written in one of dual shared system memory modules (SSM #0) and the data fails to be written in the other one of dual shared system memory modules (SSM # 1).

Returning to FIGS. 13B and 13C the content of a register for SSM address in a program-mode of external PM (EPSSAP) 28 is illustrated in FIG. 13B, while the content of a register for SSM address in a DMA-mode of external PM (EPSSAD) 32 is illustrated in FIG. 13C. In these figures, SSMAA (SSM-ACCESS ADDRESS) indicates an internal address in a specified shared system memory module 2 corresponding to the data region in which an access is finally carried out by the given processor module 1, at the time when the PS assumed "0". This internal address usually indicates the data region by a unit of 4 kbytes. Further, an DID (Destination UID) indicates a unit identifier (UID) of the specified shared system memory module 2 corresponding to the SSMAA.

The register (EPSSAP) 28 is constituted by a DID of the specified shared system memory module 2 to which an access by a program-mode is finally carried out, and also constituted by SSMAA which indicates an internal address of the specified shared system memory module 2 by a unit of 4 kbytes. On the other hand, the register (EPSSAD) 32 is constituted by a DID of the specified shared system memory module 2 to which an access by a DMA-mode is finally carried out, and also constituted by SSMAA having the bit construction similar to the case of the EPSSAP 28.

The register portion indicated by the SSMAA is referred to when all the the following cases has occurred:

① the case where a certain processor module 1 is found to assume HALT by the registers (EPSTS 24, EPSSAP 28 and EPSSAD 32);

② the case where a SBC-P 12 is found not to assume HALT;

③ the case where an access by a program-mode or a DMA-mode is not being carried out; and ④ the case where the respective data in dual shared system memory modules 2 is not equivalent to each other.

Further, the SSMAA is utilized for data recovery by copying the data region of 4 kBytes which is indicated by an internal address of a shared system memory module 2 designated by the DID.

Figure 15:
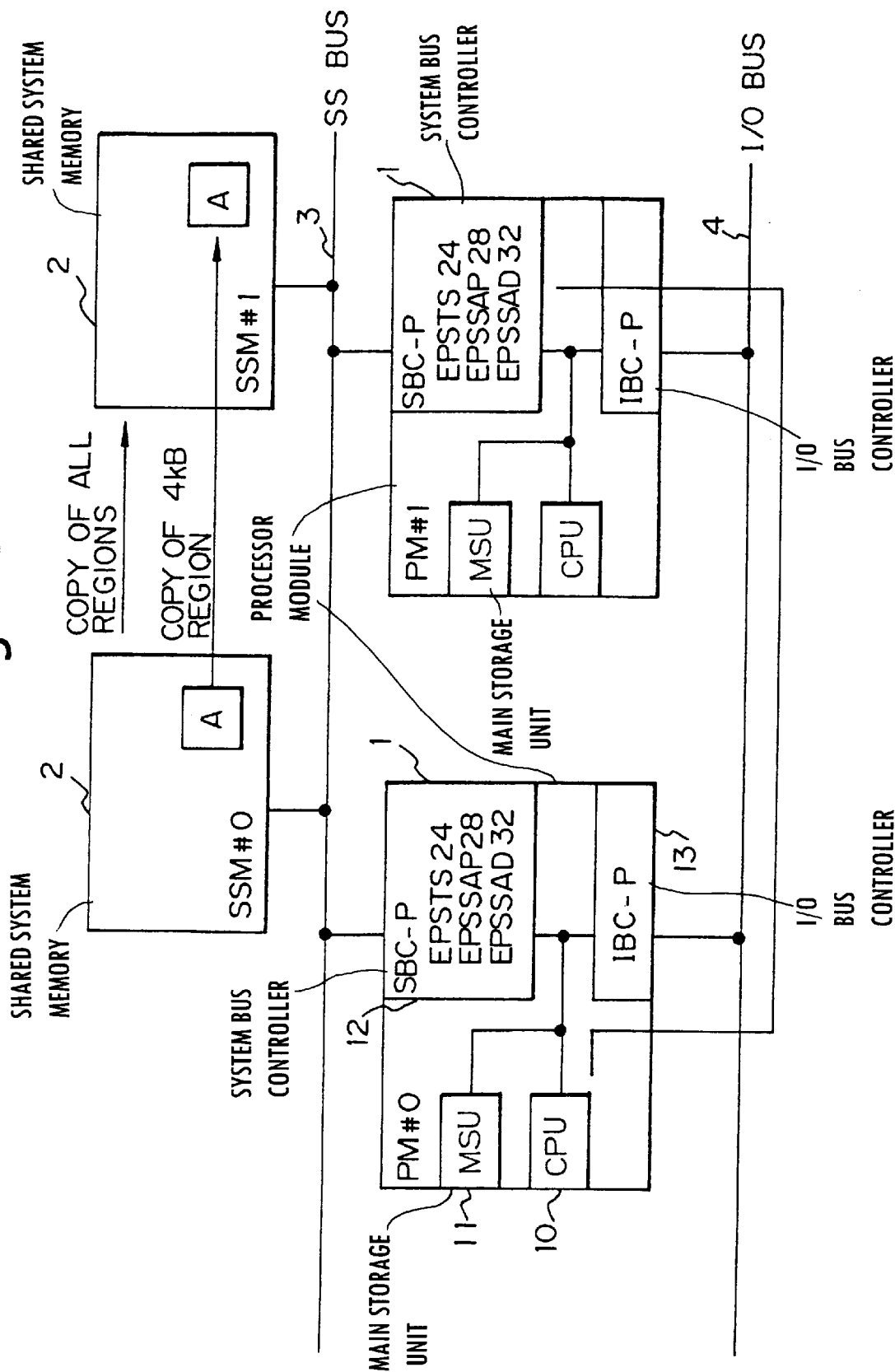
FIG. 15 is a block diagram for explaining the operation of an embodiment according to the present invention shown in FIG. 4.

FIG. 15 is a block diagram for explaining the operation of an embodiment according to the present invention shown in FIG. 4; and FIG. 16 is a flowchart for explaining the operation of an embodiment according to the present invention as shown in FIG. 15.

In FIG. 15, a plurality of processor modules 1 are constituted by two processor modules, while a plurality of shared system modules 2 are constituted by a pair of shared system modules. Further, a first processor module (PM #1) assumes HALT, and a second processor module (PM #0) is constructed to carry out a data recovery process for dual shared system system modules (SSM #0 and SSM #1).

As shown in FIG. 15 and a step S0 of FIG. 16, first of all, a central processing unit 10 of the second processor module (PM# 0) carries out a polling against a register (EPSTS) 24 provided within a SBC-P 12 in the first processor module (PM #1), and monitors a status of the first processor module (PM #1).

At this time, the first processor module (PM #1) also monitors a status of the second processor module (PM #0).

When the second processor module (PM #0) finds that the first processor module (PM #1) assumes HALT in a step S1, SBHT indicating whether or not the SBC-P 12 of the first processor module (PM #1) normally operates is referred to by the second processor module (PM #0). Further, in a step S2, the second processor module (PM # 0) checks whether or not the SBC-P 12 of the first processor module (PM #1) assumes HALT.

In the case where the SBC-P 12 of the first processor module (PM #1) assumes HALT, a copy process of all the data regions in one of the dual shared system system modules (SSM #0) is carried out as a data recovery process by using a shared system bus 3, under the control of the the second processor module (PM #0). Namely, in a step S3, all the content of one of the dual shared system system modules (SSM #0) is copied to the other one of the dual shared system system modules (SSM #1).

On the other hand, in the case where the SBC-P 12 of the first processor module (PM #1) does not assume HALT, PAT/DAT allows the second processor module (PM # 0) to assume a state of "WAIT", until an access by a program-mode or a DMA-mode in the first processor module (PM #1) is finished and a P-port or a D-port therein becomes inactive, in steps S4, S5.

After an access by a program-mode or a DMA-mode is finished, in a step S6, SUCP is referred by the second processor module (PM #0), in order to determine whether or not the respective data in dual shared system memory modules (SSM# 0 and SSM #1) is not equivalent to each other in a program-mode access. Further, in a step S7, the content of a register (EPSSAP) 28 in the first processor module (PM #1) is read out.

In a step S8, corresponding data region of 4 kBytes (region A in FIG. 15), which is indicated by SSMAA of one of the dual shared system memory module (SSM #0) designated by a DID of the register (EPSSAP) 28, is copied to the other one of the dual shared system memory module (SSM #1) by using a shared system bus 3, under the control of the the second processor module (PM #0).

Further, in a step S9, SUCD is referred by the second processor module (PM #0), in order to determine whether or not the respective data in dual shared system memory modules (SSM #0 and SSM #1) is not equivalent to each other in a DMA-mode access. Further, in a step S10, the content of a register (EPSSAD) 32 in the first processor module (PM #1) is read out.

Finally, in a step S11, corresponding data region of 4 kBytes (region A in FIG. 15), which is indicated by SSMAA of one of the dual shared system memory module (SSM #0) designated by a DID of the register (EPSSAD) 32, is copied to the other one of the dual shared system memory module (SSM #1) by using a shared system bus 3, under the control of the the second processor module (PM #0).

While the present invention has been described as related to the preferred embodiment, it will be understood that various changes and modifications may be made without departing from the spirit and the scope of the invention as hereinafter claimed.

What is claimed is:

1. A multiprocessor system having a redundant shared memory configuration, comprising:
   processor modules each having a central processing unit processing data and a first system bus controller connecting each of said processor modules to a shared system bus; and
   shared system memory modules each having a shared system memory unit commonly used by said processor modules and a second system bus controller connecting each of said shared system memory modules to said shared system bus,
   wherein a first processor module of said processor modules writes data directly in first and second shared system memory modules of said shared system memory modules, to ensure that said data respectively written in the first and second shared system memory modules are equivalent to each other,
   wherein a second processor module among said processor modules monitors a status of the first processor module, and discriminates whether a write operation for the second shared system memory module is finished via a normal termination or an abnormal termination where the first processor module stops operation,
   wherein the second processor module reads out an address corresponding to a first data in said data which failed to be normally written in the second shared system memory module when said write operation for the second shared system memory module finishes in the abnormal termination at a time when the first processor module stops operating, and
   wherein the second processor module copies said data starting from the address corresponding to the first data in the first shared system memory module to the second shared system memory module.

2. A multiprocessor system as set forth in claim 1, wherein the first system bus controller includes:
   a program-mode controller which controls an access utilizing a program-mode in accordance with a command from a corresponding central processing unit;
   a direct memory access mode controller which controls an access utilizing a direct memory access mode which allows data transfer between each of said processor modules and one of said shared system memory modules;
   a transmission/reception circuit which exchanges data with said shared system bus;
   a dual-port RAM which functions as a buffer circuit between said program-mode controller or said direct memory access mode controller and said transmission/reception circuit; and
   a register indicating a status of each of said processor modules and whether or not the write operation for one of said shared system memory modules is being executed.

3. A multiprocessor system as set forth in claim 1, wherein the second system bus controller of each of said shared system memory modules includes:
   a direct memory access controller which controls an access by a direct memory access mode that allows data transfer between each of said shared system memory modules and one of said processor modules;
   a transmission/reception circuit which exchanges data with said shared system bus; and
   a dual-port RAM which functions as a buffer circuit between said direct memory access controller and said transmission/reception circuit.

4. A multiprocessor system having a redundant shared memory configuration, comprising:
   first and second processor modules each having a central processing unit processing data and a first system bus controller connecting said two processor modules to a shared system bus; and
   first and second shared system memory modules each having a shared system memory unit commonly used by said processor modules and a second system bus controller connecting said first and second shared system memory modules to said shared system bus,
   wherein said first processor module writes data directly in said first and second shared system memory modules so as to ensure that said data respectively written in said first and second shared system memory modules are equivalent to each other,
   wherein said second processor module monitors a status of said first processor module, and discriminates whether a write operation for said second shared system memory module is finished via a normal termination or an abnormal termination where said first processor module stops operating,
   wherein said second processor module reads out an address corresponding to a first data in the data which failed to be normally written in said second shared system memory module when said write operation for said second shared system memory module finishes in the abnormal termination at a time when said first processor module stops operating, and
   wherein said second processor module copies said data starting from the address corresponding to the first data in said first shared system memory module to said second shared system memory module.

5. A multiprocessor system as set forth in claim 4, wherein the first system bus controller of each of said processor modules includes:
   a program-mode controller which controls an access utilizing a program-mode in accordance with a command from a corresponding central processing unit;
   a direct memory access mode controller which controls an access utilizing a direct memory access mode which allows data transfer between said first and second processor modules and one of said first and second system memory modules;
   a transmission/reception circuit which exchanges data with said shared system bus;

a dual-port RAM which functions as a buffer circuit between said program-mode controller or said direct memory access mode controller and said transmission/reception circuit; and a register indicating a status of said first and second processor modules and whether or not the write operation for one of said first and second shared system memory modules is being executed.

6. A multiprocessor system as set forth in claim 4, wherein the second system bus controller of said first and second shared system memory modules includes:

a direct memory access controller which controls an access by a direct memory access mode that allows data transfer between said first and second shared system memory modules and one of said first and second processor modules;

a transmission/reception circuit which exchanges data with said shared system bus; and a dual-port RAM which functions as a buffer circuit between said direct memory access controller and said transmission/reception circuit.

7. A multiprocessor system as set forth in claim 4, wherein said second processor module monitors the status of said first processor module, when a data transfer is carried out between said first processor module and said first and second shared system memory modules by an access mode in which a synchronous operation in executed.

8. A multiprocessor system as set forth in claim 4, wherein said second processor module monitors the status of said first processor module, when a data transfer is carried out between said first processor module and said first and second shared system memory modules by an access mode in which an asynchronous operation is executed.

9. A multiprocessor system as set forth in claim 4, wherein said second processor module discriminates whether the write operation is finished in normal termination or in abnormal termination, when a data transfer is carried out between said first processor module and said first and second shared system memory modules by an access mode in which a synchronous operation is executed.

10. A multiprocessor system as set forth in claim 4, wherein said second processor module discriminates whether the write operation is finished in normal termination or in abnormal termination, when a data transfer is carried out between said first processor module and said first and second shared system memory modules by an access mode in which an asynchronous operation is executed.

11. A multiprocessor system as set forth in claim 4, wherein said second processor module copies the data in said first shared system memory module to said second shared memory module, when a data transfer is carried out between said first processor module and said first and second shared system memory modules by an access mode in which a synchronous operation is executed.

12. A multiprocessor system as set forth in claim 4, wherein said second processor module copies the data in said first shared system memory module to said second shared memory module, when a data transfer is carried out between said first processor module and said first and second shared system memory modules by an access mode in which an asynchronous operation is executed.

* * * * *